(12) United States Patent
Broker et al.

(10) Patent No.: US 12,031,738 B2
(45) Date of Patent: *Jul. 9, 2024

(54) SYSTEMS AND METHODS FOR WIRELESSLY CONFIGURING CLIMATE CONTROL SYSTEM CONTROLS

(71) Applicant: Copeland Comfort Control LP, St. Louis, MO (US)

(72) Inventors: John F. Broker, Warrenton, MO (US); Mike J. Moran, St. Louis, MO (US); Nayan J. Mishra, St. Louis, MO (US); David L. Vie, Union, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,405

(22) Filed: Jun. 10, 2022

(65) Prior Publication Data

US 2022/0299229 A1 Sep. 22, 2022

Related U.S. Application Data

(63) Continuation of application No. 17/517,391, filed on Nov. 2, 2021, now Pat. No. 11,725,840, and a
(Continued)

(51) Int. Cl.
*F24H 15/395* (2022.01)
*F24F 11/41* (2018.01)
*F24F 11/58* (2018.01)
*F24H 1/18* (2022.01)
*F24H 15/104* (2022.01)
(Continued)

(52) U.S. Cl.
CPC ............ *F24F 11/58* (2018.01); *F24F 11/41* (2018.01); *F24H 1/186* (2013.01); *F24H 15/104* (2022.01); *F24H 15/395* (2022.01); *G06V 20/62* (2022.01); *H04L 67/125* (2013.01); *H04W 4/33* (2018.02)

(58) Field of Classification Search
CPC . F24F 11/58; F24F 11/41; F24H 1/186; F24H 15/104; F24H 15/395; G06V 20/62; H04L 67/125; H04L 67/12; H04W 4/33; H04W 4/38
See application file for complete search history.

(56) References Cited

U.S. PATENT DOCUMENTS 3,840,322 A 10/1974 Cade
5,720,604 A * 2/1998 Kelly ...................... F23N 5/123
340/579
(Continued)

*Primary Examiner* — Michael W Choi
(74) *Attorney, Agent, or Firm* — Armstrong Teasdale LLP

(57) ABSTRACT

A gas powered appliance includes a burner for burning gas, a flame sensor positioned proximate the burner to detect a strength of a flame on the burner and to output signals indicative of the strength of the flame, and a controller connected to the flame sensor. The controller includes a communication interface, a processor, and a memory containing instructions that program the controller to control the burner, receive the signals from the flame sensor indicative of the strength of the flame, determine the strength of the flame from the received signals, and output, using the communication interface, an indication of the strength of the flame to a mobile device for display on the mobile device.

17 Claims, 16 Drawing Sheets

Related U.S. Application Data continuation of application No. 17/199,902, filed on Mar. 12, 2021, now Pat. No. 11,441,806, and a continuation of application No. 16/750,468, filed on Jan. 23, 2020, now Pat. No. 11,662,094, said application No. 17/517,391 is a continuation-in-part of application No. 16/008,817, filed on Jun. 14, 2018, now Pat. No. 11,193,682.

(60) Provisional application No. 62/988,683, filed on Mar. 12, 2020, provisional application No. 62/520,771, filed on Jun. 16, 2017.

(51) Int. Cl.
*G06V 20/62* (2022.01)
*H04L 67/125* (2022.01)
*H04W 4/33* (2018.01)

(56) References Cited

U.S. PATENT DOCUMENTS

| | | |
|---|---|---|
| 2004/0174265 A1 | 9/2004 | Kociecki et al. |
| 2006/0130496 A1* | 6/2006 | Chapman ............... F24F 11/38 236/1 C |
| 2010/0061034 A1* | 3/2010 | Kaplan ................ F23Q 3/004 361/256 |
| 2012/0288806 A1* | 11/2012 | Racaj .................... F23N 5/123 431/18 |
| 2014/0087661 A1* | 3/2014 | Kim ..................... H04B 5/0025 455/41.1 |
| 2014/0096726 A1* | 4/2014 | Boros ................... F24H 1/206 122/18.1 |
| 2016/0047548 A1* | 2/2016 | Farley ................... F23N 5/242 126/116 A |
| 2017/0294825 A1 | 10/2017 | Waikar et al. |
| 2018/0321652 A1* | 11/2018 | Jablokov ............. G05B 19/042 |
| 2018/0363934 A1 | 12/2018 | Vie et al. |
| 2021/0266712 A1 | 8/2021 | Magnavacca |

\* cited by examiner

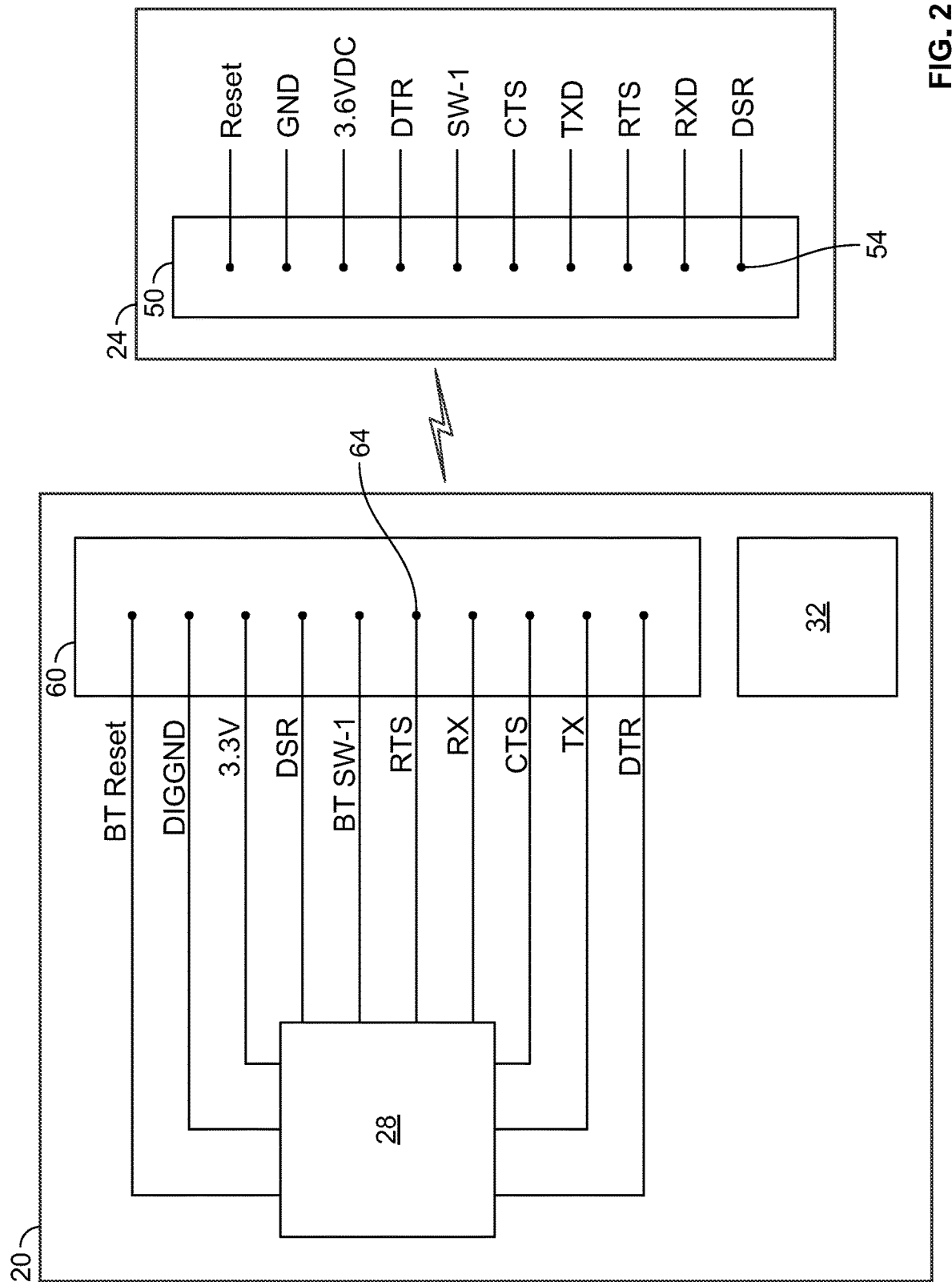

| OEM | Defrost Type | Defrost Cycle Time | Short Cycle Time | RV Power | RV Shift Delay | Max Defrost Time | Defrost Enable Coil Temp | Defrost Terminate Coil Temp |
|---|---|---|---|---|---|---|---|---|
| C nnnn | T/T | 90 min | 5 min | 0 | 0 sec | 10 min | 30° | 65° |
| G bbbb | T/T | 80 min | 5 min | 0 | 30 sec | 10 min | 35° | 70° |
| Lxxxx | Demand | n/a | 5 min | 0 | 30 sec | 14 min | 35° | 50° |
| Tyyyy | Demand | n/a | 0 min | 0 | 12 sec | 14 min | 35° | 50° |
| Rzzzz | Demand | n/a | 5 min | 8 | 30 sec | 14 min | 35° | 70° |
| Ykkkk | Demand | n/a | 5 min | 0 | 30 sec | 8 min | 31° | 80° |
| Nmmmm | Demand | n/a | 3 min | 0 | 30 sec | 14 min | 35° | 70° |
| Factory Default | Demand | n/a | 5 min | 0 | 30 sec | 14 min | 35° | 70° |

FIG. 3

| Set-Up Feature | Set-Up Details | |
|---|---|---|
| Display Orientation | Rotates the Display for Easy Viewing | |
| Error | Displays Current System Errors. | |
| Fault Recall | Displays Stored System Errors. | |
| Quick Set up by OEM | Selects | |
| | Cnnnn (1) | Rzzzz (5) |
| | Gbbbb (2) | Ykkkk (6) |
| | Lxxxx (3) | Nmmmm (7) |
| | Tyyyy (4) | Default (8) |
| Defrost Type | Selects Demand Defrost or Timed Temperature Defrost. | |
| Enable Temperature | Selects Coil Temperature (degrees F) Allowing Timed / Temperature or Demand Defrost to Accumulate Run Time. Above this Temperature a Defrost Cycle will not Occur. | |
| Termination Temperature | Selects Desired Coil Temperature to Terminate Defrost Cycle (degrees F) | |
| Defrost Cycle Time (Timed / Temp Defrost only) | Selects Accumulated Compressor Run Time (minutes) before Entering Defrost Mode. (Appears for Timed Temperature Defrost Systems Only). | |
| Short Cycle Time | Selects Minimum Time Delay (minutes) between Cycles. | |
| Reversing Valve Power | "O" Selection Energizes Reversing Valve in Cool, "B" Energizes Reversing Valve in Heat (B). | |
| Reversing Valve Shift Delay Time | Selection Limits Excessive Noise In and Out of a Defrost Cycle (in seconds). | |

FIG. 4A

| Set-Up Feature | Set-Up Details |
|---|---|
| Maximum Defrost Time | Selection Limits Maximum Defrost Time (Minutes) |
| Auxiliary Heat Lockout | Settings Allow the Control to Act as an Outdoor Thermostat to Prevent Auxiliary Heat from Coming on Until the Outdoor Temperature Drops to the Selected Temperature (Degrees F). |
| Low Temp Compressor Cutout | Settings Allow the Control to Act as an Outdoor Thermostat to Turn off the Heat Pump and Use Only Auxiliary Heat when it's Too Cold for the Pump to Operate Efficiently (Degrees F). |
| Brownout Random Time Start Delay | "On" Selects a 5 to 90 Second Random Time Start Delay After a Brownout |
| Low Pressure Switch | Accommodates Systems with or without a Low Pressure Switch - if the System Does not Have a Low Pressure Switch to "off" |
| High Pressure Switch | Accommodates Systems with or without a High Pressure Switch - if the System Does not Have a High Pressure Switch to "off" |
| 24V Brownout Protection | "On" Turns Off the Compressor and Fan if Low Voltage Drops Below 15.5VAC. |

FIG. 4B

| | 13:52 Settings Connected | ⏰ ⁂ 42% 🔋 |
|---|---|---|
| SYSTEM SETTINGS | | |
| Defrost Type | | Demand › |
| Reversing Valve Power | | 0 › |
| Random Start Delay Time | | ⬤ |
| Low Pressure Switch | | ⬤ |
| High Pressure Switch | | ⬤ |
| 24V Brownout Protection | | ⬤ |
| TEMPERATURE SETTINGS | | |
| Enable Temperature | | 35 F › |
| Termination Temperature | | 70 F › |
| Supplemental Heat Lockout | | Off › |
| Low Temp Compressor Cutout | | Off › |
| TIME SETTINGS | | |
| Defrost Cycle Time | | N/A |
| Short Cycle Time | | 5 Min › |
| Reversing Valve Shift Delay | | 30 Sec › |
| Maximum Defrost Cycle | | 14 Min › |
| SPECIAL SETTINGS | | |
| Display Orientation | | Hi › |
| Configure | | |

SYSTEMS AND METHODS FOR WIRELESSLY CONFIGURING CLIMATE CONTROL SYSTEM CONTROLS

CROSS-REFERENCE TO RELATED APPLICATION

This application is a continuation of U.S. patent application Ser. No. 17/517,391 filed Nov. 2, 2021, which is a continuation-in-part of U.S. patent application Ser. No. 16/008,817 filed Jun. 14, 2018, which claims the benefit and priority of U.S. Provisional Application No. 62/520,771 filed Jun. 16, 2017. This application is also a continuation of U.S. patent application Ser. No. 17/199,902 filed Mar. 12, 2021, which claims the benefit and priority of U.S. Provisional Patent Application No. 62/988,683 filed Mar. 12, 2020. This application is also a continuation of U.S. patent application Ser. No. 16/750,468 filed Jan. 23, 2020. The contents of all aforementioned U.S. patents, U.S. patent applications, and U.S. provisional patent applications are hereby incorporated by reference herein in their entirety.

FIELD

The present disclosure generally relates to wirelessly configuring climate control system controls.

BACKGROUND

This section provides background information related to the present disclosure which is not necessarily prior art.

The operational parameters of a heating, ventilation and air conditioning (HVAC) component (e.g., furnace, air conditioner, heat pump, etc.) may be set by using an HVAC control or controller. In setting the operational parameters, a contractor, installer, or original equipment manufacturer may refer to a display that indicates, e.g., status and fault information.

Gas powered appliances (such as a gas powered furnace, a gas powered oven, a gas powered water heater, and the like) include a burner at which gas is burned. Such appliances typically include a flame sensor to detect when a flame is present on the gas powered burner, so that gas is not emitted from the burner for extended periods of time when a flame is not present.

In at least some gas powered appliances, the flame sensor includes one or more electrodes positioned near the location of the expected flame from the gas powered burner. A voltage is applied to one of the electrodes. When no flame is present, there is no path for current from the electrode to which the voltage is applied, and no current flows from the electrode. When a flame is present on the burner, current will pass through the ionized gases of the flame from the electrode (e.g., to another electrode, to ground, to the burner, or the like). By monitoring for the presence or absence of this current (sometimes referred to as a flame current), the gas powered appliance can determine if a flame is present on the burner.

Moreover, the amount of current that will flow from the electrode varies somewhat depending on the strength of the flame. That is, a small or spluttering flame will allow less current to flow than a strong, normal flame. The flame current typically will have both a DC and an AC component. The DC portion of the current is typically used to indicate flame strength. Thus, at least some gas powered appliances attempt to monitor the value of the DC current to estimate the strength of the flame. Because the current flowing from the electrode and through the flame is very small (the DC portion is typically less than five microamps DC), such strength estimation is typically very coarse, providing only three levels: strong flame, weak flame, and no flame. Often the weak flame level is very close to the no flame level so not much warning time is available, once the weak flame level is reached, there is not much decrease in current until the flame will not be able to be detected and a no flame condition will exist and the appliance will not be able to provide function.

Because the flame sensor electrode is present in the combustion chamber near the flame of the gas powered appliance, the electrode typically becomes coated with deposits from the combustion. These deposits insulate the electrode, thereby reducing the current that can flow from the electrode. Thus, the amount of current flowing from the electrode may also be an indication of the condition of the electrode of the flame sensor. That is, a low current may indicate a weak flame, a dirty sensor electrode, or both.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a gas powered water heater includes a storage tank for holding water, a main burner for burning gas to heat water in the storage tank, a flame sensor positioned proximate the main burner to detect a strength of a flame on the main burner and to output signals indicative of the strength of the flame, and a controller connected to the flame sensor. The controller includes a communication interface, a processor, and a memory containing instructions that program the controller to: control the main burner to selectively heat water in the storage tank, receive the signals from the flame sensor indicative of the strength of the flame, determine the strength of the flame from the received signals, and output, using the communication interface, an indication of the strength of the flame to a mobile device for display on the mobile device.

Another aspect is a gas powered appliance including a burner for burning gas, a flame sensor positioned proximate the burner to detect a strength of a flame on the burner and to output signals indicative of the strength of the flame, and a controller connected to the flame sensor. The controller includes a communication interface, a processor, and a memory containing instructions that program the controller to control the burner, receive the signals from the flame sensor indicative of the strength of the flame, determine the strength of the flame from the received signals, and output, using the communication interface, an indication of the strength of the flame to a mobile device for display on the mobile device.

Another aspect is a system including a mobile device and a gas powered appliance. The mobile device includes a display, a mobile device communication interface, and a mobile device controller including a mobile device processor and a mobile device memory. The gas powered appliance includes a burner for burning gas, a flame sensor positioned proximate the burner to detect a strength of a flame on the burner and to output signals indicative of the strength of the flame, and a controller connected to the flame sensor. The controller includes an appliance communication interface, a processor, and a memory containing instructions that program the controller to: control the burner, receive the signals from the flame sensor indicative of the strength of the flame, determine the strength of the flame from the received signals, and output, using the appliance communication interface, an indication of the strength of the flame to a mobile device for display on the mobile device. The mobile device memory contains instructions that program the mobile device controller to receive the indication of the strength of the flame using the mobile device communication interface, and to display the indication of the strength of flame on the display.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The drawings described herein are for illustrative purposes only of selected embodiments and not all possible implementations, and are not intended to limit the scope of the present disclosure.

FIG. 2 is a diagram of selected components of a universal heat pump defrost control and a mobile device, each configured in accordance with one example embodiment of the disclosure;

FIG. 3 is an example table of original equipment manufacturers (OEMs) of defrost controls and corresponding defrost control parameters for each OEM;

FIGS. 4A and 4B describe example defrost control set-up features that may be provided wirelessly to a mobile device as menu choices in accordance with various implementations of the disclosure;

FIGS. 5A, 5B, 5C, and 5D are screenshots of selectable menu items and information displayed in accordance with one example embodiment of the disclosure.

Corresponding reference numerals indicate corresponding (although not necessarily identical) parts throughout the several views of the drawings.

DETAILED DESCRIPTION

Figure 1:
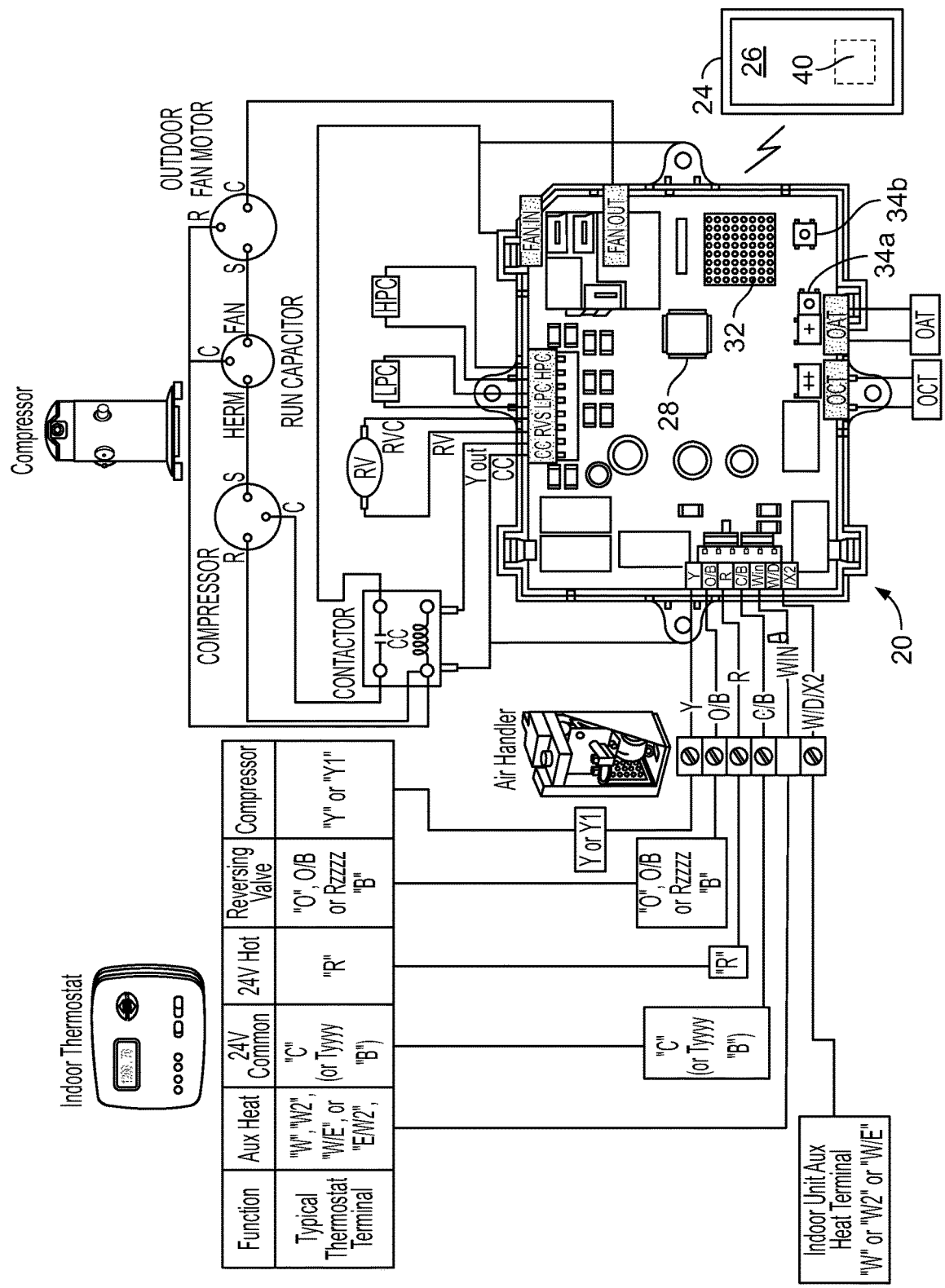
FIG. 1 illustrates a universal heat pump defrost control and a mobile device, each configured in accordance with one example embodiment of the disclosure.

Example embodiments will now be described more fully with reference to the accompanying drawings.

The inventors hereof have recognized that control boards for HVAC controls for HVAC equipment, units, systems, etc., including but not limited to furnaces, heat pumps and air handlers, are becoming increasingly complex. Conventional furnace, heat pump and air handler units typically have to be opened up in order to access control boards, to access fault and/or operational data, and/or to change configuration settings. It can be difficult for a service technician or other user to configure HVAC controls via dipswitches, push buttons and/or LEDs, which can be difficult for the user to read, understand and execute correctly, particularly in dark and confined spaces that can be very hot or very cold. Blinking LED fault codes can be misread and misinterpreted.

Further, for units in need of replacement HVAC controls, it often can be difficult to configure a replacement for a control that has a large number of options. A large number of possible options also can make it difficult to provide a universal control for such units. Many conventional interfaces for installing replacement HVAC controls require an installer to understand the settings of an old control and to manually set them for a replacement control.

Accordingly, the inventors have developed and disclose herein exemplary embodiments of an HVAC control having a power supply and a short-range wireless communication interface (e.g., BLUETOOTH (BT), Near Field Communication (NFC), etc.) or other radio communication interface, which may be integrated into a circuit board of the control. In various embodiments, an installer may use a software application on a smart phone or other mobile computing device to configure such a control. In some embodiments, the HVAC control radio communication interface is connectable with a BT or other radio communication interface of an installer's mobile device.

A series of menu items may be provided to the installer, who may follow the menu items to install the HVAC control. In various embodiments, a software application menu may list a plurality of HVAC control types that could be configured using the software application, and a user may select from the menu a type of control to configure.

Additionally or alternatively, when a software application on a user's mobile device has been connected with a control via BT or other radio communication interface, the software application may query the HVAC control as to its type and thereafter automatically present the appropriate control configuration menu to the user on the mobile device. In embodiments in which a control is to be configured as a replacement for an existing control, a software application on a user mobile device may query the existing control to extract its programmable parameters, pre-populate selection criteria in the application with the extracted parameters, and download the selections to the replacement control.

In some embodiments, a user may enter, e.g., by typing and/or by voice command, a type and number for a particular HVAC control (which may be new or a replacement) into a software application on the user's mobile device, after which the application contacts a remote server to obtain parameter selection criteria for the user-identified control.

The server may fetch the parameter selection information from a database and send the values to the application for download to the control.

Thus, in various embodiments, all configurable parameters may be automatically selected, and in the case of a new control, the installer or other user may modify one or more parameters based, e.g., on installation specifics. As one example, an installer might adjust a parameter for the speed of a circulator, to suit the total duct length at an installation site.

In various embodiments in which a replacement control is to be installed, a user may enter, e.g., by typing and/or by voice command, a part number of the old control into a software application on a smart phone. Additionally or alternatively, the user may use the phone to take a picture of a label of the old control. The software application may thereby recognize the old control automatically and access the default setting(s) for the old control. This could be done also in relation to a product label and/or in relation to other part(s) of the system, e.g., to optimize most if not all settings.

Characters from a label could be recognized, and/or identifying information could be retrieved, e.g., from a bar code label, typed in or selected from a list, etc. The software application could use such label information, e.g., to query "the cloud" to retrieve default settings for the old control and automatically configure the default settings as selected settings for the replacement control. The installer may accept the default settings if desired, and/or make any desired changes via the application to the settings, e.g., before the settings are loaded into the new replacement control.

In some embodiments, actual settings of a new control may be stored based, e.g., on the location or address or serial number, as the new control is configured and installed. Such information could be saved for future use. In various embodiments, an installer may be directed graphically, e.g., by an application on the installer's phone, which could "walk" the installer through decision points in an installation process and let the installer decide each step.

A first step might be, e.g., for the installer to: (a) type, speak, or otherwise enter into the application, control/ product information for an existing control that is to be replaced, (b) take a picture of the label of the existing control, or (c) skip to a following step. The following step might be for the installer to make a selection of what the existing control is to be replaced with. In various embodiments, the application might suggest a replacement control and provide a replacement control number.

The application may also suggest other or additional system part number(s)/control number(s) and/or parameters. The installer may accept defaults and/or change them. In various embodiments, the application may store default settings for a wireless-enabled control in the cloud, on a remote server, etc., so that when the control is replaced, the exact defaults can be loaded into the new control.

It should be noted generally that although embodiments are described herein with reference to universal HVAC controllers, embodiments are also contemplated in relation to non-universal controllers. It also should be noted that unless otherwise indicated, terms such as "configuration," "set-up," "installation," "configuring," "setting up" and "installing" may be used interchangeably herein. Embodiments are contemplated relative to various parameters, commands, settings, etc., whereby climate control system controls may be operated and/or made operable.

With reference now to the figures, FIG. 1 illustrates an exemplary embodiment of an example universal heat pump defrost control 20 embodying one or more aspects of the present disclosure. The universal defrost control 20 may be used, e.g., as replacement for any one of a plurality of different defrost controls made by different manufacturers and that have different set-up parameters. Typically, after a defrost control has been wired into a climate control system, the installer determines which setup parameters to apply in the defrost control.

The defrost control 20 includes a microcontroller 28, which in the present example embodiment is a PIC24F-type microcontroller. The defrost control 20 also includes a display device 32, which in the present example embodiment is a dot matrix LED display controlled by the microcontroller 28. An "option" push button 34 *a* and a "select" push button 34 *b* may be used for selecting a menu on the LED display 32 and then setting or adjusting operational parameters for the selected menu.

Additionally or alternatively, the LED display 32 and push buttons 34 *a*-34 *b* may be used for recalling a fault. In various embodiments of the present disclosure, however, an installer may additionally or alternatively use a software application to make such determinations and to push appropriate setup parameters to the defrost control 20. For example, the defrost control 20 is wirelessly connectable with a mobile computing device 24, e.g., a smart phone, tablet, laptop, etc., (hereinafter referred to as "mobile device.") The mobile device 24 has a processor and memory 40 that includes and/or has access to a software application executable to configure the defrost control 20, e.g., as further described below. The mobile device 24 also has a display, e.g., a touchscreen 26, and, in various embodiments, a voice processing capability.

As shown in FIG. 2, the example defrost control 20 and mobile device 24 are both Bluetooth-enabled and may communicate with each other, e.g., via BLE (Bluetooth Low Energy) communication interfaces. The example mobile device 24 includes a Bluetooth module 50 having J6 connections 54.

In the present example embodiment, the connections 54 may provide the following functionalities. "Reset" enables the Bluetooth module 50 in the mobile device 24 to be reset. "GND" and "3-6 VDC" connect respectively to grounding and power provided in the mobile device 24. "DTR" may be activated to send a "data terminal ready" signal. "SW-1" is for enabling/disabling Bluetooth connectivity. "CTS" may be activated to send a "clear to send" signal. "TxD" may be activated to send a "transmitted data" signal. "RTS" may be activated to send a "request to send" signal. "RxD" may be activated to send a "received data" signal. "DSR" may be activated to send a "data set ready" signal.

The example defrost control 20 includes a Bluetooth interface 60 having connections 64 that correspond to the mobile device 24 connections 54. Thus, for example, data sent wirelessly by the mobile device 24 via the "TxD" pin of the Bluetooth module 50 may be received by the microcontroller 28 via the "Rx" pin of the Bluetooth interface 60, and data sent wirelessly by the microcontroller 28 of the defrost control 20 via the "Tx" pin of the Bluetooth interface 60 may be received by the mobile device 24 via the "RxD" pin of the Bluetooth module 50. The "DIGGND" and "3.3V" connections provide the Bluetooth interface 60 with power from power circuits (not shown) of the defrost control 20. The "BT Reset" of the interface 60 may be connected to a switch, e.g., to a momentary pushbutton (not shown) and activated to perform a hardware reset of the interface 60.

In some embodiments, the reset capability may be used in a pairing process between the defrost control 20 and the mobile device 24. For example, a user may push a reset button on the defrost control 20 to reset the entire control. As the control 20 powers back up, it may start the Bluetooth radio in pairing mode. The software application, which is running at the same time, may acknowledge the pairing request when the user uses the mobile device 24 to activate the acknowledgement. The application and the mobile device 24 thus would be paired to the control 20.

The user then may configure the control 20 using the software application and Bluetooth connection. In some embodiments, a pairing button or other switch may be provided on the control 20 instead of a reset switch. The example Bluetooth interface 60 is an OBS421 module, manufactured by ublox AB, which includes a microprocessor and radio. It should be noted, however, that although the Bluetooth interface 60 is shown in FIG. 2 as an integral Bluetooth module, various components could be integrated into a control in various ways to provide a Bluetooth and/or other radio interface.

In various embodiments, an installer may use the software application on the mobile device 24 to configure the universal defrost control 20 for operation in a particular climate control system. In some embodiments, the software application displays, on the mobile device touchscreen 26, a main menu having an item for "manufacturer selection." Additionally or alternatively, the software application may provide menu items audibly, from the mobile device 24 to an installer.

In the present example embodiment, the installer may select the "manufacturer selection" menu item to display a list of manufacturers (OEMs) that provide a defrost control as part of their equipment lineup. The installer may use the touchscreen 26 to select one of the manufacturers, e.g., by touching one of the OEM names displayed in the list, or by using a voice command, to transmit a selection of one of the manufacturers to the software application on the mobile device 24. In response to the installer's OEM selection, the software application may transmit parameter values corresponding to the selected OEM to the microcontroller 28 for populating parameters of the universal defrost control 20.

FIG. 3 illustrates an example list of OEMs 300 and corresponding defrost control parameters 308 for each OEM. Under "Defrost Type", "T/T" means time/temperature. When T/T defrosting is performed, an outdoor unit runs a fixed number of minutes in heat pump mode, then performs a defrost cycle, and then returns to heat pump mode. "Demand" is a defrost method in which the unit only performs a defrost cycle when it is needed. This is typically done using two temperature sensors, one on the coil, the other sensing the outdoor temperature.

Referring to FIG. 1, for example, the universal defrost control 20 receives sensor input from a coil temperature sensor OCT and an outdoor ambient temperature sensor OAT. When the difference, during operation, of the coil temperature and the outdoor temperature exceeds a given value, e.g., 10° F., the unit performs a defrost cycle. This method works on the principle that frost forms an insulating barrier to the heat exchanger, and alters the typical delta between the coil and outdoor temperature.

In various embodiments, a software application on a mobile device is configured to assist an installer by displaying, speaking, and/or otherwise providing information pertinent, e.g., to selectable parameters. Additionally or alternatively, a software application on a mobile device may be configured to receive voice commands from an installer requesting and/or providing information to the software application. In various embodiments, a plurality of menu choices and submenu values may be provided on the touchscreen 26 for selection therefrom by the installer. The installer may use such menus to configure a defrost control "manually," i.e., without using parameters as may be automatically provided for a given OEM.

Additionally or alternatively, the installer may select from such menus in order to make adjustments to certain parameters. Example set-up features that may be provided as menu choices are listed and described in FIGS. 4A and 4B. An example main menu screen, shown in FIG. 5A, includes most of the set-up parameters of FIGS. 4A and 4B. As shown in FIG. 5A, parameters are characterized as "System Settings", "Temperature Settings", "Time Settings", and "Special Settings".

In various embodiments, the software application allows a given menu item to be selectable only if it is consistent with setting(s) previously selected by the installer. For example, because the first setting selection, "Defrost Type", has been set to "Demand", a setting applicable only to "T/T" defrost is not available for selection by the installer. Thus a "Time Settings" menu item for "Defrost Cycle Time" is set to "N/A".

In this way, the installer may be guided to select only parameters as appropriate for the control being configured.

Figure 5B:
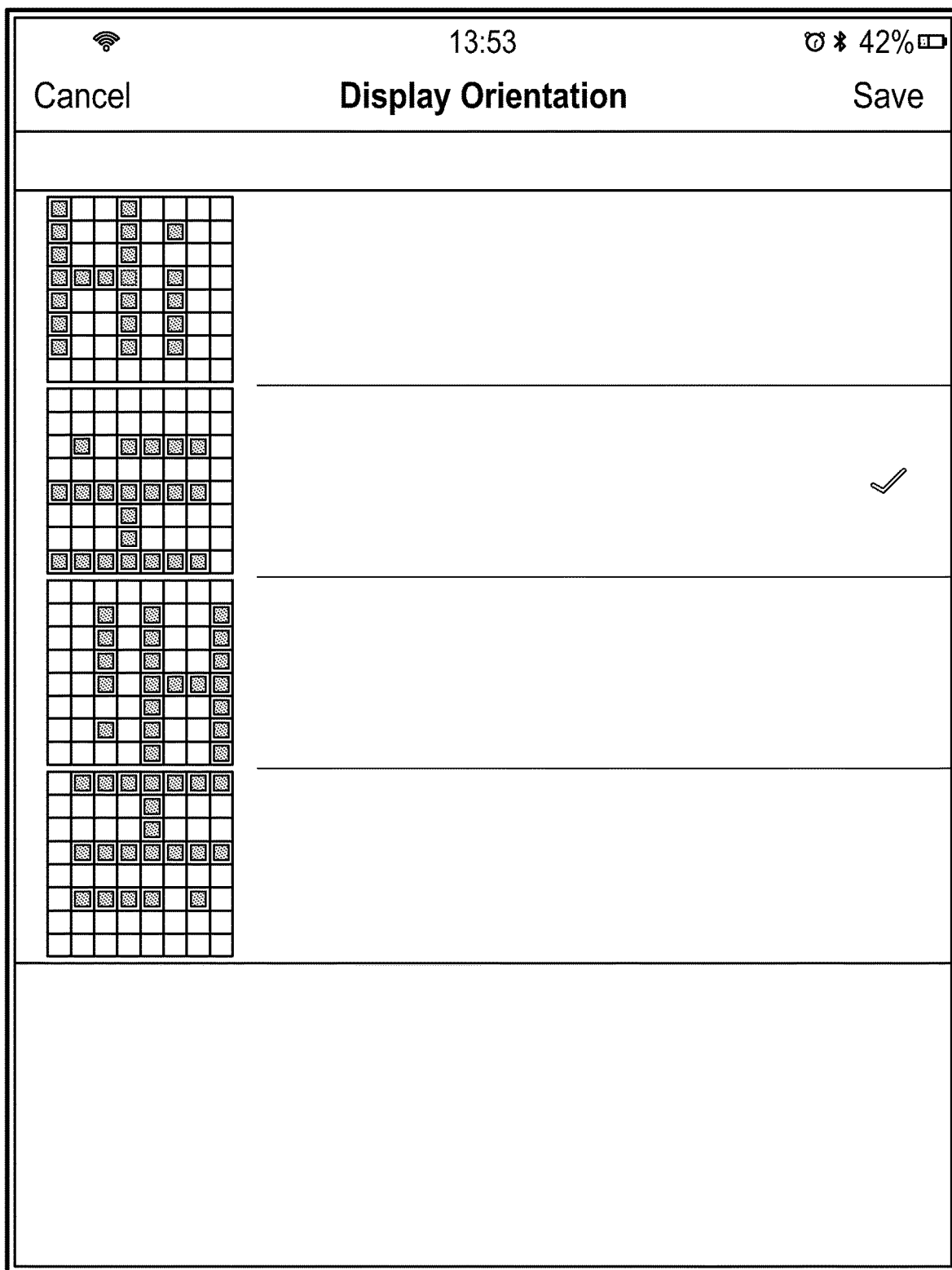

If the installer selects "Display Orientation" on the main menu, a display orientation selection screen is displayed, e.g., as shown in FIG. 5B. The installer then may select an orientation for displays on the defrost control LED display 32.

Generally, a display can be difficult to read when the orientation of equipment holding the display is changed. For example, many furnaces can be installed up-flow, down-flow, or horizontally and may be field-convertible. As shown in FIG. 5B, the installer may select from four different orientations of the LED display 32, e.g., by touching the selected orientation on the touchscreen 26. The installer thus may change the orientation from the upright "Hi" orientation (shown in FIG. 5A as the current orientation) to one of the other three orientations if desired.

Figure 5C:
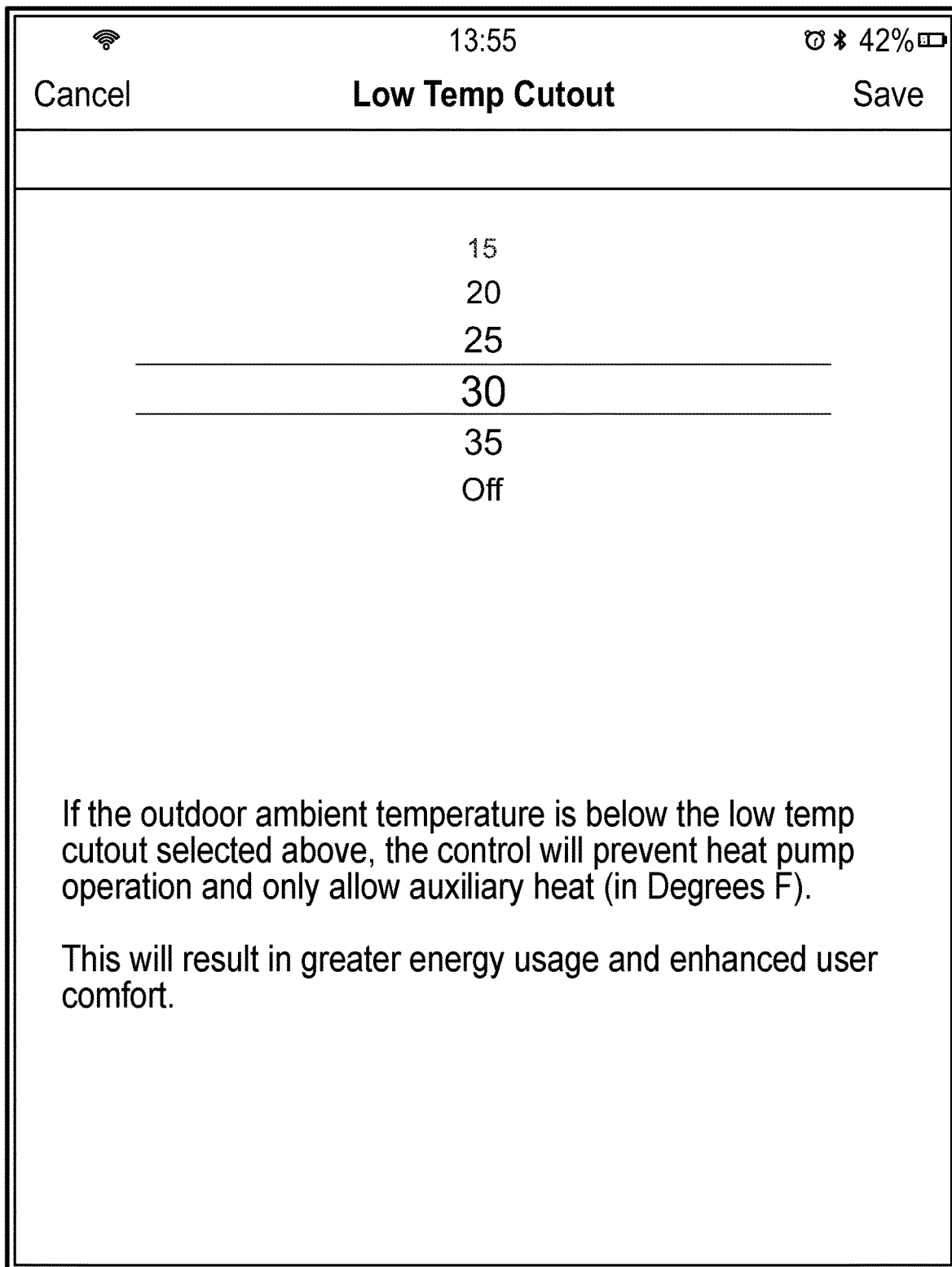

In various embodiments, the software application is configured to assist an installer by displaying information pertinent to selectable parameters. For example, if an installer selects "Low Temp Compressor Cutout" from the main menu of FIG. 5A, a selection screen may be displayed, e.g., as shown in FIG. 5C. A range of low temperatures is displayed from which the installer may select an outdoor temperature at which heat pump operation is prevented. In addition to the low temperature range, the selection screen of FIG. 5C displays a description of how the "Low Temp Compressor Cutout" parameter is used by the defrost control 20, and the impact of that selection.

For example, FIG. 5C illustrates that the installer selected 30 degrees Fahrenheit (° F.) from the range of possible temperature selections from 15° F. to 35° F. (in 5° F. increments). Also by way of example, the selection screen shown in FIG. 5C includes the following: "If the outdoor ambient temperature is below the low temp cutout selected above, the control will prevent heat pump operation and only allow auxiliary heat (in Degrees F.). This will result in greater energy usage and enhanced user comfort." Accordingly, FIG. 5C illustrates an example of how the selection screen may display a description of how the "Low Temp Compressor Cutout" parameter is used by the defrost control 20 and the impact of that selection.

As another example, a range of temperatures may be displayed from which the installer may select a defrost termination temperature. The different available selections for the defrost termination temperature include 50° F., 60°

F., 65° F., 70° F., 75° F., 80° F., 90° F., and 100° F., wherein 70° F. is a default setting. The defrost termination temperature may be defined as the coil temperature used to terminate a defrost cycle, wherein the goal is the ensure a completely clear coil before ending the defrost cycle. In this example, an explanation of the impacts of making different defrost termination temperature selections may include that higher temperature values will generally result in a longer defrost cycle, which, in turn, will result in increased energy usage as backup heat (gas or electric) will be used. The explanation may also include suggestions, such as one or more of: if the heat pump is not installed on snow legs or otherwise elevated off the ground, a higher value may be necessary; if the heat pump is installed in an area with windy conditions, a higher value may be necessary; if the heat pump is installed in a geographical area where high humidity and icing can be expected, a higher value may be necessary; and the lowest value that will typically result in a clear coil after defrost will yield the greatest system efficiency.

In exemplary embodiments, the user interface of a mobile device is configured to allow the installer (broadly, a user) to access the explanation of the impacts of making different available defrost termination temperature selections before the installer makes a specific selection from the different available defrost termination temperature selections.

Figure 5D:
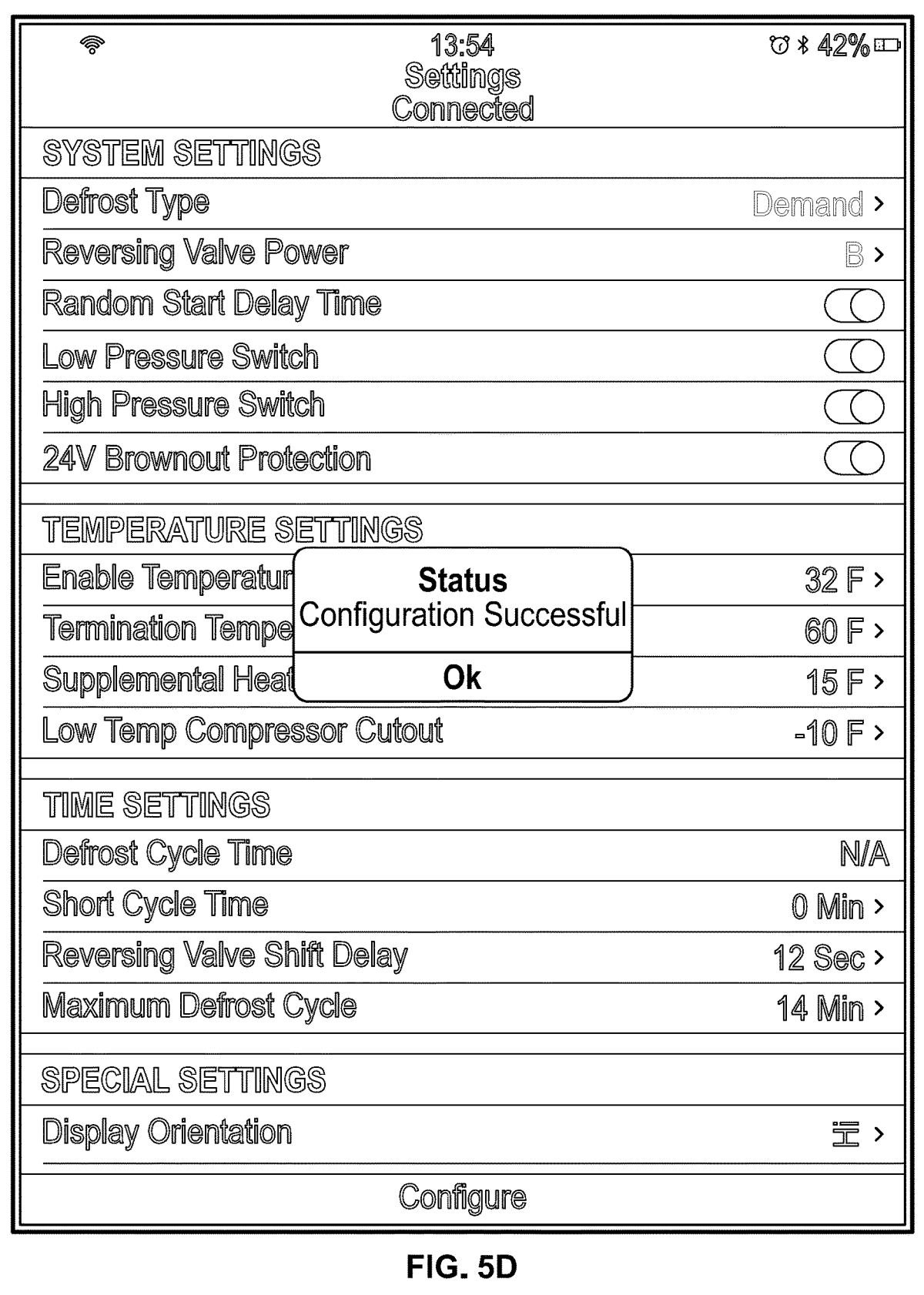

When the installer has completed parameter selection, the installer may touch "Configure" on the main menu screen, to instruct the software application to wirelessly push the selected parameters to the defrost control 20. A status screen may then be displayed, e.g., as shown in FIG. 5D. In various embodiments, if configuration was not successful, the software application may communicate with the defrost control microcontroller 28 to determine and display any errors.

Figure 6:
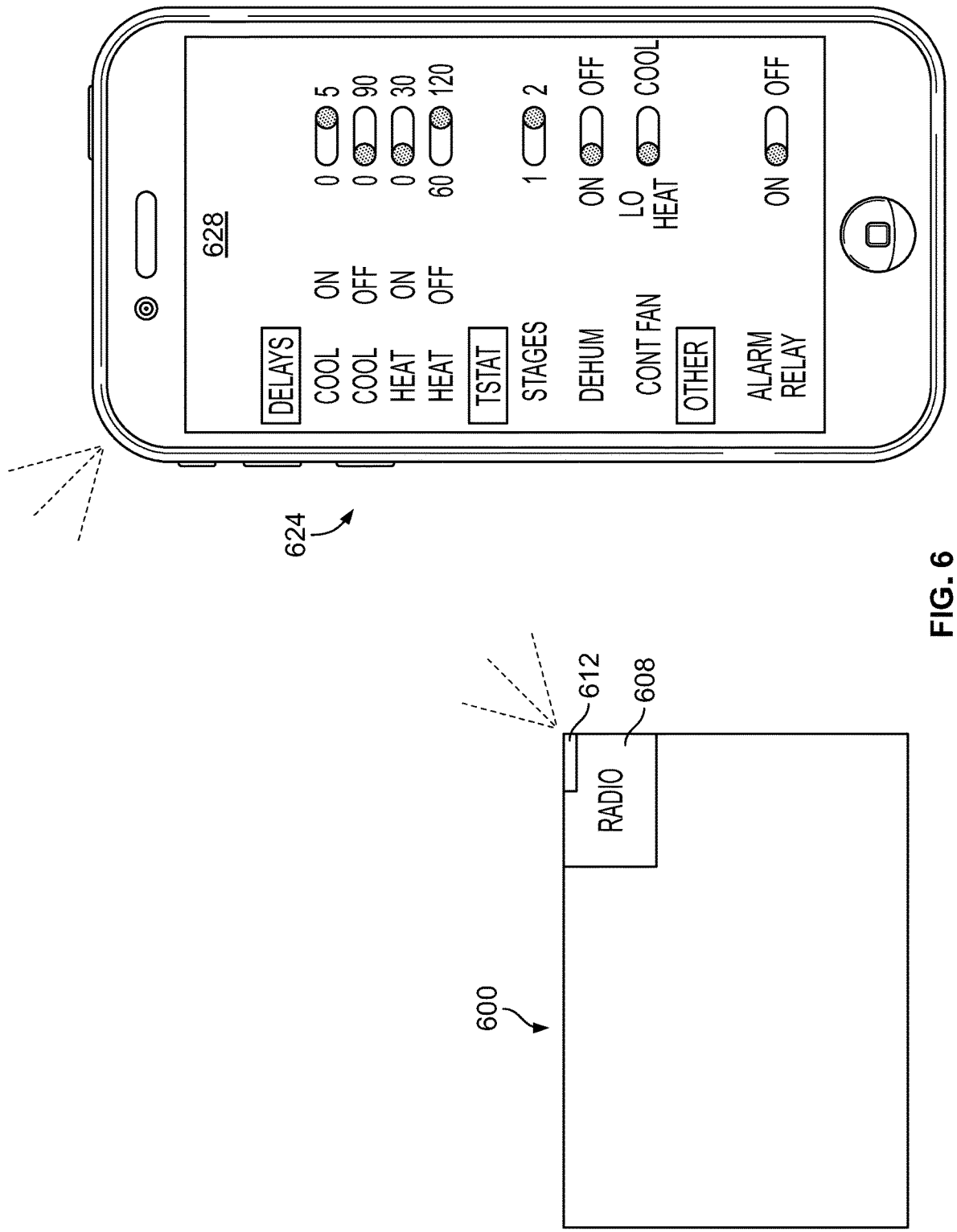
FIG. 6 is a diagram of an example integrated furnace control (IFC) and a user mobile device configured to provide setup parameters to the IFC in accordance with an example implementation of the disclosure.

Another example embodiment of a control is shown in FIG. 6. An example integrated furnace control ("IFC") 600 includes a microprocessor with memory, a radio 608, and an antenna 612 configured for wireless communication, e.g., via Bluetooth LE, with a mobile device 624, e.g., a phone or tablet having a display screen 628. On the mobile device display screen 628 is displayed an example menu of heating and cooling delays, thermostat settings, and other settings, such as an alarm relay setting. The various settings are selectable, e.g., by an installer of the IFC 600.

In another example embodiment, an HVAC system includes at least one HVAC component, and an HVAC control configured to control the at least one HVAC component according to one or more HVAC system configuration parameters.

The HVAC control includes a controller wireless interface and a memory. The system also includes a mobile device having a user interface and a mobile wireless interface in wireless communication with the controller wireless interface of the HVAC control.

The mobile device is configured to display the one or more HVAC system configuration parameters on the user interface, receive user input settings for the one or more HVAC system configuration parameters, and wirelessly transmit the received user input settings for the one or more HVAC system configuration parameters to the controller wireless interface of the HVAC control.

The HVAC control is configured to store the received user input settings for the one or more HVAC system configuration parameters in the memory of the HVAC control to control the at least one HVAC component according to the received user input settings for the one or more HVAC system configuration parameters.

In some cases, the HVAC control includes a control board and the controller wireless interface includes a short-range wireless communication interface (e.g., BLUETOOTH). The mobile device may include a mobile phone, a tablet computer, etc. The user interface of the mobile device may be configured to display selection information corresponding to each of the one or more HVAC system configuration parameters indicative of effects of different selection options for said HVAC system configuration parameters on performance of the HVAC system.

The user interface of the mobile device may be configured to receive at least one of an installation date, a location and an installer name. In that case, the mobile device is configured to wireless transmit the received at least one of an installation date, a location and an installer name to the controller wireless interface of the HVAC control, and the HVAC control is configured to store the received at least one of an installation date, a location and an installer name in the memory.

The HVAC system may include at least one of a wireless air temperature sensor, a wireless coil temperature sensor and a wireless humidity sensor, and the mobile device can be configured to wirelessly transmit one or more setting parameters of the wireless air temperature sensor, the wireless coil temperature sensor and/or the wireless humidity sensor to the controller wireless interface of the HVAC control. In some cases, the mobile device is configured to wirelessly transmit a software update to the controller wireless interface of the HVAC control, and the HVAC control is configured to store the received software update in memory.

In some embodiments, the HVAC control is configured to wirelessly transmit at least one of a fault code and operational data to the mobile wireless interface of the mobile device, and the mobile device is configured to display the received fault code and/or operational data on the user interface. For example, the operational data may include, but is not limited to, flame sense readings over time, air temperature readings over time, coil temperature readings over time, a defrost cycle, a serial number, a model number, an installation date, runtime data, a geographical location, etc.

The mobile device may be configured to determine a model number identifier of the HVAC control and to display installation information corresponding to the HVAC control in response to the determined model number identifier of the HVAC control. In some cases, the HVAC control is configured to wirelessly transmit settings of the one or more HVAC system configuration parameters that are currently stored in the memory of the HVAC control to the mobile wireless interface of the mobile device.

According to another example embodiment of the present disclosure, an HVAC system includes at least one HVAC component, and an HVAC control configured to control the at least one HVAC component according to one or more HVAC system configuration parameters. The HVAC control includes a controller wireless interface and a memory.

The HVAC system also includes a mobile device having a user interface, a camera, and a mobile wireless interface configured for wireless communication with the controller wireless interface of the HVAC control. The mobile device is configured to obtain an identity of the HVAC control which identity is determined by parsing an image of a label of the HVAC control as captured by the camera or by receiving a model number of the HVAC control entered into the user interface.

For example, the mobile device may be configured to determine the identity of the HVAC control by the mobile device parsing the image of the label of the HVAC control as captured by the camera or by the mobile device receiving the model number of the HVAC control entered into the user interface. Alternatively, or in addition, a remote device (e.g., a remote server) could determine the identity of the HVAC control, etc.

The mobile device is also configured to cause default settings for the one or more HVAC system configuration parameters from a remote server based on the identified HVAC control to be wirelessly transmitted to the controller wireless interface of the HVAC control.

For example, the mobile device may be configured to obtain the default settings for the one or more HVAC system configuration parameters from the remote server based on the identified HVAC control, and wirelessly transmit the settings for the one or more HVAC system configuration parameters to the controller wireless interface of the HVAC control. Alternatively, or in addition, a remote device (e.g., a remote server) could wirelessly transmit the settings to the HVAC control, etc.

The HVAC control is configured to store the received settings for the one or more HVAC system configuration parameters in the memory of the HVAC control to control the at least one HVAC component according to the received settings for the one or more HVAC system configuration parameters.

In this example embodiment, the label may include at least one of a product label of the HVAC control and a barcode label of the HVAC control, and the mobile device may be configured to parse the image by recognizing characters in the product label and/or the barcode label. Alternatively, or additionally, the mobile device may be configured to receive the model number of the HVAC control by displaying a list of possible HVAC control model numbers and receiving a user selection from the displayed list.

In some cases, the mobile device is configured to display the received default settings from the remote server on the user interface of the mobile device, receive adjustments to the default settings via user input at the user interface, and wirelessly transmit the adjusted settings to the controller wireless interface of the HVAC control. In that case, the mobile device may be configured to save the adjusted settings along with at least one of a location, and address and a serial number of the HVAC control. The mobile device may be configured to determine a suggested replacement HVAC control based on the identified HVAC control, and display the suggested replacement HVAC control on the user interface.

According to another example embodiment of the present disclosure, a method of controlling an HVAC system including an HVAC component is disclosed. The method includes controlling, by the HVAC control, the at least one HVAC component according to one or more HVAC system configuration parameters, displaying the one or more HVAC system configuration parameters on a user interface of the mobile device and receiving, via the user interface, user input settings for the one or more HVAC system configuration parameters.

The method also includes wirelessly transmitting the received user input settings for the one or more HVAC system configuration parameters from the mobile device to a controller wireless interface of the HVAC control, and storing the received user input settings for the one or more HVAC system configuration parameters in a memory of the HVAC control to control the at least one HVAC component according to the received user input settings for the one or more HVAC system configuration parameters.

In some embodiments, the method may include identifying, by the mobile device, the HVAC control by parsing an image of a label of the HVAC control as captured by a camera on the mobile device, or by receiving a model number of the HVAC control entered into the user interface, and obtaining default settings for the one or more HVAC system configuration parameters from a remote server based on the identified HVAC control.

According to another example embodiment, an HVAC control includes a control interface in communication with at least one HVAC component to control the at least one HVAC system according to one or more HVAC system configuration parameters, a controller wireless interface configured for wireless communication with a mobile wireless interface of a mobile device, and a memory.

The HVAC control is configured to wirelessly receive user input settings for the one or more HVAC system configuration parameters from the mobile device via the controller wireless interface of the HVAC control. The HVAC control is also configured to store the received user input settings for the one or more HVAC system configuration parameters in the memory of the HVAC control to control the at least one HVAC component according to the received user input settings for the one or more HVAC system configuration parameters.

Example HVAC controls and mobile devices described herein may be configured to perform operations using any suitable combination of hardware and software. For example, the HVAC controls and mobile devices may include any suitable circuitry, logic gates, microprocessor(s), computer-executable instructions stored in memory, etc., operable to cause the HVAC controls and mobile devices to perform actions described herein (e.g., controlling an HVAC component, wirelessly transmitting settings, etc.).

In various embodiments in which an installer's mobile device includes voice processing capability, an installer may issue voice commands to the mobile device. In some embodiments, a software application on the mobile device processes a voice command from the installer and transmits a corresponding digital command wirelessly to a climate control system control.

The control may wirelessly transmit a response to the software application, in which case the software application provides a corresponding voice response to the installer on the mobile device. Thus, for example, an installer may issue voice commands via a smart phone to an IFC to set up and configure the IFC, to troubleshoot, and/or to obtain diagnostics regarding the IFC. The installer may speak into the smart phone, e.g., to ask, "What is the flame sense reading?" and the IFC may wirelessly transmit a response, e.g., "0.2 micro Amps," which is spoken to the installer by the smart phone. As another example, an installer may issue a voice command to an IFC to turn on the circulator for a test. The installer thus is provided with a convenient way to test the circulator, without having to open up the unit and use a jumper wire.

As still another example, an installer could issue a voice command to a heat pump defrost control to "run a forced defrost." Generally, it should be understood that the processing of mobile device commands and/or climate control system control responses (whether given by voice or otherwise) could be distributed in various ways, e.g., between a given mobile device and a given climate control system control.

Embodiments of the disclosure can facilitate an installer's configuration of controls. Installation can take less time and can be less error-prone than when installation is performed manually. Rather than having to set multiple dipswitches, or navigating through a long menu that uses LEDs and push buttons, an installer can configure all necessary settings using a software application, and then push the data to the control. The software application can provide more detail on available configuration selections to help a service technician make better choices.

For example, before a user chooses a defrost enable temperature, the user may access an explanation by the software application of the impact(s) of making different available selections. See, for example, FIG. 5C. Wireless alarms and sensors for air temperature, col temperature, humidity, etc., and more, could be easily added, in contrast to the difficulty or impossibility of adding alarms and/or system sensors where hard wiring is a requirement. Installation date, location, installer name, and other data could be loaded to the control for future warranty tracking and analysis.

Various embodiments can provide advantages relating to control servicing. For example, software updates could be pushed to the control in the field and/or remotely. Fault codes and/or other operational data could be received from the control without having to open up the unit. This may reduce (e.g., eliminate) miscounting of the blinks of an LED. Fault codes can include information on the basic system items to check out for any given code, like an embedded fault tree.

System data could be logged and sent to the application on the mobile device for analysis during a service call. Examples might be flame sense readings over time, air and coil temperature readings over time or during an event, such as a defrost cycle. A service technician could work in a comfortable space to do the necessary configuration work, e.g., before going to the unit for upload. For example, the technician would not have to stand outside on a 10-degree day while configuring a new universal heat pump control. Software application embodiments can also provide much of the data typically found in a printed installation manual, e.g., once the individual control is identified by its model number.

Various embodiments can provide advantages relating to control replacement. For example, an original equipment manufacturer (OEM) of a given control can add items to be configured on the control, without worrying that the control might become too complex for an average service technician to work on.

In various embodiments, configuration settings from the existing control can be uploaded and transferred to the replacement control. Unit serial number, model number, installation dates, installer name, lifetime heating/cooling/defrost/other cycles, runtime data, geographical location and more could be pulled from the control for improved warranty reporting and analysis.

Warranty-supporting information is often unavailable for many existing controls, since there typically is no way to upload such information to the controls. Unlike most standard controls, software on the foregoing control embodiments can be updated in the field, if needed. Supporting documentation for a given control embodiment can be stored, instead of becoming lost or unreadable over time from age.

In some embodiments, the system includes a gas powered appliance. For conciseness, examples below will be described with respect to a gas powered water heater. However, the methods and systems described herein may be applied to any suitable gas powered appliance, including without limitation a gas powered dryer, a gas powered furnace, a gas powered oven.

Figure 7:
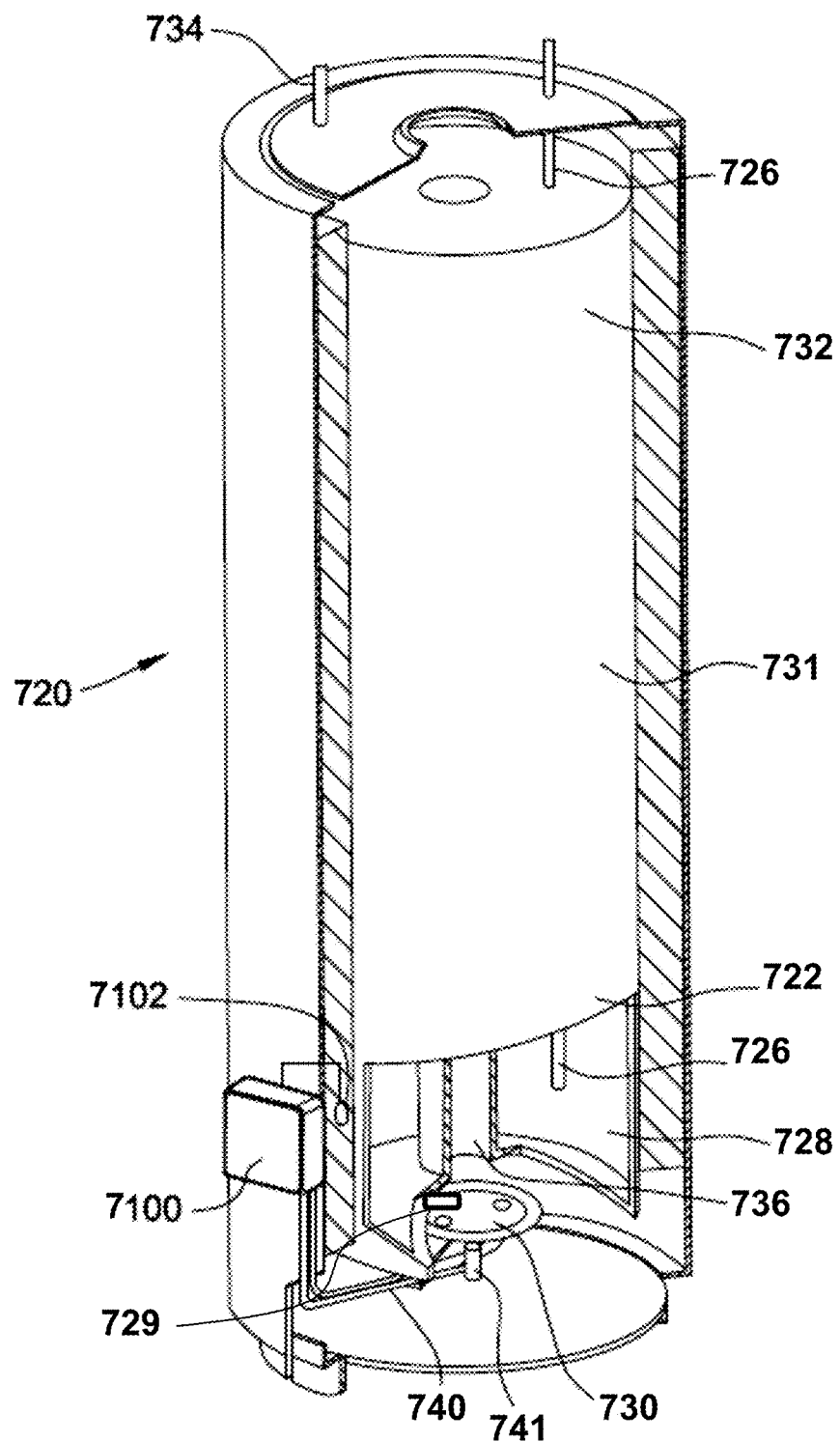
FIG. 7 is a cut-away view of a water heater including one embodiment of a control system for controlling operation of the water heater.

Referring initially to FIG. 7, a control system 7100 is provided for controlling operation of a water heater 720 to maintain a setpoint temperature of water in the water heater 720. The water heater 720 has a storage tank 722 that stores heated water and receives cold water via a cold water inlet 726. Cold water entering a bottom portion 728 of the storage tank 722 is heated by a fuel-fired main burner 730 beneath the storage tank 722. Water leaves the storage tank 722 via a hot water outlet pipe 734. Combustion gases from the main burner 730 leave the water heater 720 via a flue 736. The control system 7100 provides for control of gas flow via a gas supply line 740 and one or more valves (not shown) to the main burner 730, as described herein. The gas burned by the water heater 720 may be natural gas, liquid propane (LP) gas, or any other suitable gas for powering a water heater. A flame sensor 729 is communicatively coupled to the control system 7100 and positioned near the main burner 730 to detect (for the control system 7100) the presence or absence of a flame produced by the main burner 730. Moreover, the control system 7100 controls a standing (i.e., continuously lit) pilot burner 741 that operates as an ignition source for the main burner 730. The control system 7100 also controls gas flow via gas supply line 740 and one or more valves (not shown in FIG. 7) to the pilot burner 741. Alternatively, the ignition source may be a piezoelectric lighter or any other suitable ignition source. In some embodiments, a piezoelectric lighter is used to ignite the pilot burner 741.

The control system 7100 includes a sensor 7102 that provides an output or value that is indicative of a sensed temperature of the water inside of the storage tank 722. For example, the sensor 7102 may be a tank surface-mounted temperature sensor, such as a thermistor. Alternatively, in other embodiments, the sensor 7102 may be a temperature probe or any other sensor suitable for measuring the water temperature in storage tank 722. In the embodiment shown in FIG. 7, sensor 7102 is positioned proximate bottom portion 728 of the storage tank 722. Alternatively, the sensor 7102 may be positioned to detect the temperature of the water in the storage tank 722 at any other suitable portion or portions of the storage tank, such as a middle portion 731, an upper portion 732, or a combination of bottom, middle, and/or upper portions. Moreover, the control system 7100 may include more than one sensor 7102. For example, the control system 7100 may include two or more temperature sensors 7102 for detecting the water temperature at one or more locations in the storage tank 722. In one example, the control system 7100 includes two sensors 7102 that are thermistors mounted on a circuit board positioned within a watertight tube near the bottom of the storage tank 722. The two thermistors detect the temperature of the water near the bottom portion 728 of the storage tank 722.

The control system 7100 is positioned, for example, adjacent the storage tank 722. Alternatively, the control system 7100 is located underneath the storage tank 722, in a watertight compartment within the storage tank 722, or in any other suitable location. Sensor 7102 is in communication with control system 7100, and provides control system 7100 an output or value indicative of the water temperature in storage tank 722. In some embodiments, a second sensor (not shown) may be disposed at an upper portion 732 of the water heater 720, to provide an output or value that is indicative of a sensed temperature of the water in upper portion 732 of storage tank 722. The flame sensor 729 is in communication with control system 7100, and provides control system 7100 an output or value indicative of the presence or absence of a flame on the main burner 730.

Various embodiments of the control system 7100 may include and/or be embodied in a computing device. The computing device may include, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by a processor, cause the processor to perform at least a portion of the methods described herein.

Figure 8:
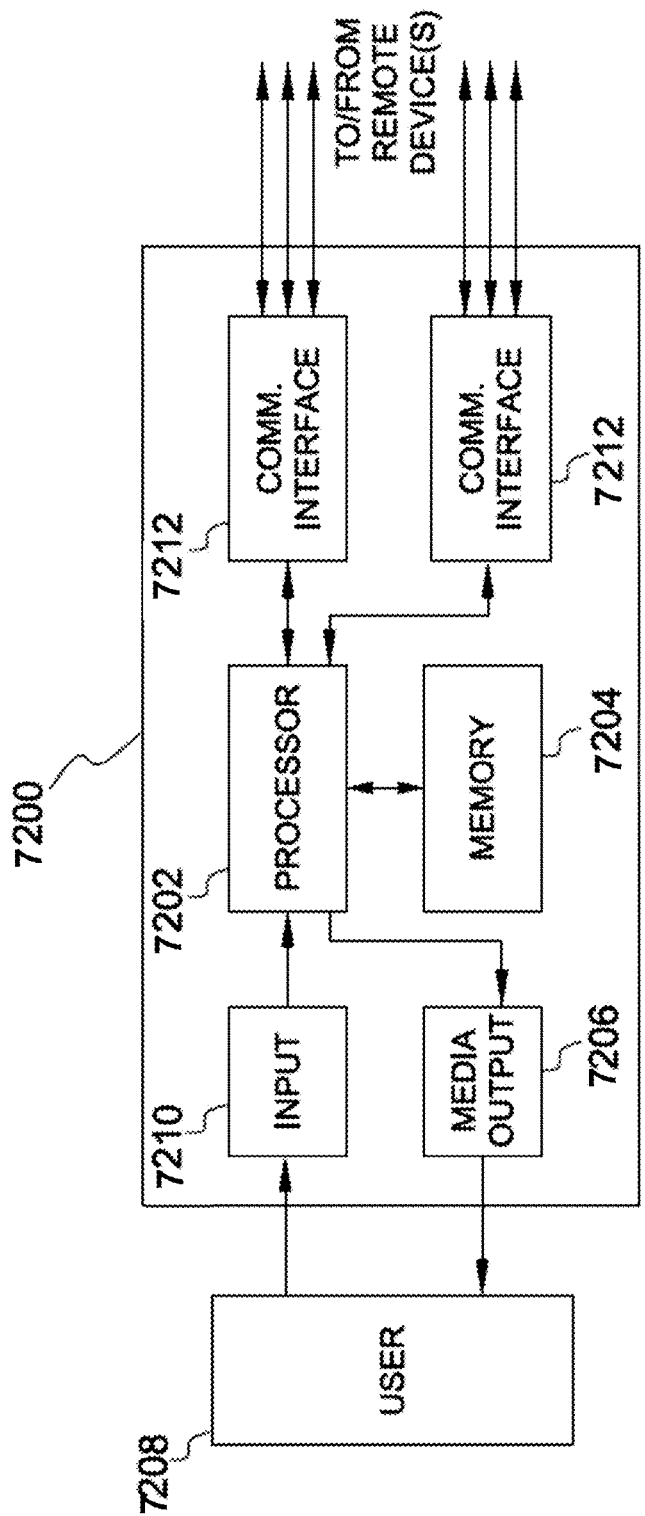
FIG. 8 is a block diagram of a computing device for use in the water heater shown in FIG. 7.

FIG. 8 is an example configuration of a computing device 7200 for use as a controller in the control system 7100. The computing device 7200 includes a processor 7202, a memory 7204, a media output component 7206, an input device 7210, and communications interfaces 7212. Other embodiments include different components, additional components, and/or do not include all components shown in FIG. 8.

The processor 7202 is configured for executing instructions. In some embodiments, executable instructions are stored in the memory 7204. The processor 7202 may include one or more processing units (e.g., in a multi-core configuration). The memory 7204 is any device allowing information such as executable instructions and/or other data to be stored and retrieved. The memory 7204 may include one or more computer-readable media.

The media output component 7206 is configured for presenting information to user 7208. The media output component 7206 is any component capable of conveying information to the user 7208. In some embodiments, the media output component 7206 includes an output adapter such as a video adapter and/or an audio adapter. The output adapter is operatively connected to the processor 7202 and operatively connectable to an output device such as a display device (e.g., a liquid crystal display (LCD), organic light emitting diode (OLED) display, cathode ray tube (CRT), "electronic ink" display, one or more light emitting diodes (LEDs)) or an audio output device (e.g., a speaker or headphones).

In an example embodiment, the media output 7206 is connected to a display device (shown in FIG. 9) on the water heater 720 that displays an indication of the strength of the flame produced by the main burner 730, as detected by the flame sensor 729. The indication of the strength of the flame may be represented on the display device by a displayed number (e.g., a percentage, a number within a predefined range of numbers, or the like), by the number of lighted LEDs in a group of LEDs, by the brightness of a light (e.g., brighter light for a stronger flame and weaker light for a weaker flame), by the color of a light, by a displayed text description of the strength of the flame (e.g., "strong flame"), or by any other suitable display of the absolute or relative strength of the flame detected by the flame sensor 729. Moreover, the flame sensor 729 operates through use of an electric current flowing through the flame produced by the main burner 730. In some embodiments, the controller 7100 displays the value of the current flowing through the flame as the indication of the strength of the flame.

The computing device 7200 includes, or is connected to, the input device 7210 for receiving input from the user 7208. The input device is any device that permits the computing device 7200 to receive analog and/or digital commands, instructions, or other inputs from the user 7208, including visual, audio, touch, button presses, stylus taps, etc. The input device 7210 may include, for example, a variable resistor, an input dial, a keyboard/keypad, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 7206 and the input device 7210.

The communication interfaces 7212 enable the computing device 7200 to communicate with remote devices and systems, such as sensors, valve control systems, safety systems, remote computing devices, and the like. The communication interfaces 7212 may be wired or wireless communications interfaces that permit the computing device to communicate with the remote devices and systems directly or via a network. Wireless communication interfaces 7212 may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Wired communication interfaces 7212 may use any suitable wired communication protocol for direct communication including, without limitation, USB, RS232, I2C, SPI, analog, and proprietary I/O protocols. In some embodiments, the wired communication interfaces 7212 include a wired network adapter allowing the computing device to be coupled to a network, such as the Internet, a local area network (LAN), a wide area network (WAN), a mesh network, and/or any other network to communicate with remote devices and systems via the network.

The memory 7204 stores computer-readable instructions for control of the water heater 720 as described herein. In some embodiments, the memory area stores computer-readable instructions for providing a user interface to the user 7208 via media output component 7206 and, receiving and processing input from input device 7210. The memory 7204 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 9:
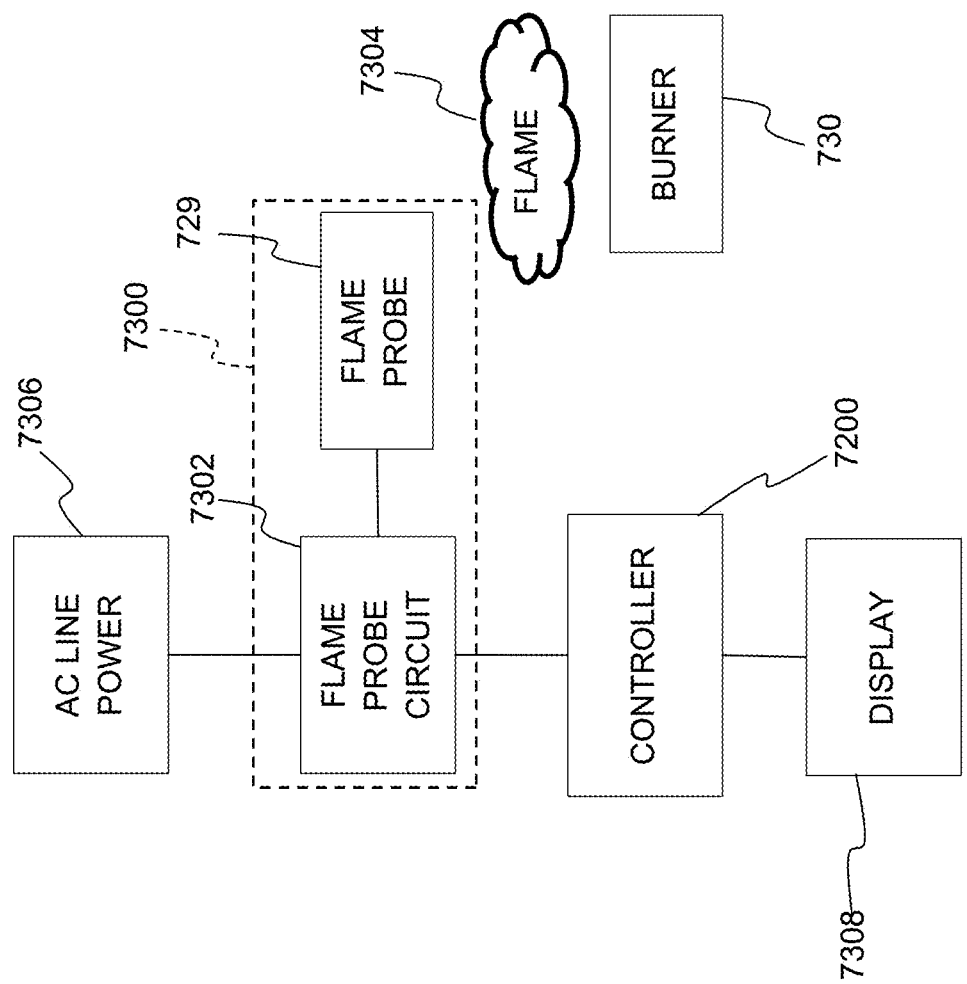
FIG. 9 is a block diagram of a portion of the water heater shown in FIG. 7 including a flame sensor assembly.

FIG. 9 is a block diagram of a portion of the water heater 720 including a flame sensor assembly 7300. The flame sensor assembly 7300 includes the flame probe 729 and a flame probe circuit 7302 coupled to the flame probe 729. The flame probe circuit 7302 and the controller 7200 form at least part of the control system 7100.

The flame probe 729 is positioned proximate the main burner 730 to couple an electric current to the main burner 730 through a flame 7304 on the main burner 730 and not to couple an electric current to the main burner 730 when the flame is not present on the main burner 730. That is, when flame 7304 is not present (e.g., because water is not being heated or because flame 7304 has not been ignited on the main burner because of a failure), an open circuit exists between the flame probe 729 and the main burner 730. When the flame 7304 exists, the flame (and the ionized gases around the flame) close the circuit between the main burner 730 and the flame probe 729, thereby allowing a small electrical current, consisting of an AC and a DC component, (influenced from AC power source 7306) to flow from the flame probe 729 to the main burner 730.

The flame probe circuit 7302 functions as a detector that detects when current is flowing from the flame probe to the burner and provides to the controller 7200 signals representative of the electric current provided through the flame probe 729. The signals are digital signals that indicate either the flame 7304 is present or the flame 7304 is absent. The actual flame probe current is an AC current plus a DC current, the presence or absence of which is converted to the digital signal. When the flame 7304 is present, current has been flowing from the flame probe to the burner, and the system is in a substantially steady state, the flame probe circuit 7302 outputs a substantially constant logic high signal to the controller 7200. When the flame 7304 is not present, current has not been flowing from the flame probe to the burner, and the system is in a substantially steady state, the flame probe circuit 7302 outputs a substantially constant logic low signal to the controller 7200. Alternatively, a logic low signal may be used for the presence of the flame 7304 and a logic high signal may be used for the absence of the flame 7304. Because the flame current (i.e., the current from the flame probe 729 to the main burner 730) is an AC current plus a DC current and the flame acts like a diode for the AC flame current, when the main burner transitions between no flame and flame (in either direction), the signals output by the flame probe circuit 7302 to the controller 7200 will fluctuate between a logic high and a logic low output (at the same frequency as the AC power source 7306) for a length of time before settling to a steady state (either logic high or logic low). The length of time during which the signal fluctuates is proportional to the amount of DC current flowing from the flame probe 729 to the main burner 730.

The control system 7100 (and specifically the controller 7200) is programmed to control the main burner 730 to selectively heat water in the storage tank 722. The control system 7100 is also programmed to determine, based on the signals representative of the electric current, a length of time taken for a transition between a signal representative of no electric current and a signal representative of a steady state electric current (in either direction). Based at least in part on this determined length of time, the control system 7100 determines a strength of the flame on the main burner 730.

The strength of the flame 7304 may be determined as a flame current amount, a relative strength of flame (e.g., high, medium high, medium, medium low, low, no flame, and the like), a relative strength on a numerical scale (e.g., maximum flame=10, no flame=zero, and numbers between 0 and 10 indicate relative strengths between maximum flame and no flame), or as any other suitable representation of the strength of the flame 7304. In the example embodiment, the control system 7100 determines the strength of flame from more than three possible strengths of flame. That is, the control system 7100 is programmed to determine an indication of the strength of the flame as an indication of one of a plurality of predetermined strengths, where the plurality of predetermined strengths is more than three strengths. Thus, the example system provides more granular information about the strength of flame than some known systems, which typically only determine the presence or absence of a flame, and possibly a low flame level between the two. In the example, each flame strength level represents a range of flame currents. Alternatively, each flame strength level may represent a specific flame current.

The control system 7100 determines the strength of the flame 7304 based on the length of time that the signal from the flame probe circuit fluctuates between logic high and logic low before settling to a steady state (whether logic high or logic low). In the example embodiment, the length of time is determined by monitoring an actual length of time taken from the first change in the logic state from the flame probe circuit 7302 until the signal settles to either a logic high or logic low signal for a period of time (e.g., a predetermined number of cycles based on the frequency of the AC power source 7306, a predetermined length of time, or the like). Alternatively, the determined length of time may be the number of fluctuations between the logic high and the logic low, rather than an actual time measurement.

The control system 7100 compares the determined length of time to data stored in the memory 7204 that indicates correspondences between lengths of time and the strength of the flame (or the value of the flame current as a representative of the strength of the flame). In some embodiments, the data is predetermined and has fixed correspondences. In other embodiments, the data is variable depending on the magnitude of the voltage output by the AC power source 7306. This may be achieved by inclusion of multiple sets of correspondences, one for each of a plurality of different AC voltages, or by including one set of correspondences and scaling factors to adjust the one set of correspondences for different AC voltages. Embodiments that determine the strength of flame based in part on the voltage of the AC power source 7306 may also include a voltage sensor (not shown) to detect the voltage input by from the AC power source 7306. Alternatively, a user may input the voltage of the AC power source 7306 to the control system 7100, such as via input 7210.

In other embodiments, the control system 7100 may calculate the strength of the flame (or the value of the flame current as a representative of the strength of the flame) based on the determined length of time. For example, the control system 7100 may multiply the determined length of time by a current magnitude per unit time (or number of fluctuation cycles) to arrive at the flame current, which may be used as a representative of the strength of the flame. For the flame off to on time, the shorter the time the more the current, so it is inversely related, not proportional, but for the flame on to off time, the shorter is weaker and longer is stronger (more current).

In some embodiments, the control system 7100 is programmed to set initial values for the flame current in response to a received user input (such as via input 7210) and determine future strengths of flame relative to those initial values. For example, this setting may be performed when the water heater 720 is first assembled and/or any time the flame probe 729 is replaced or cleaned. Thus, the control system 7100 may learn the maximum flame strength when the flame probe is new (or newly replaced) and determine subsequent flame strengths relative to the maximum flame strength detection of the particular flame probe 729 when new. For example, the control system 7100 may store, in the memory 7204, an initial length of time taken for a transition between a signal representative of no electric current and a signal representative of the steady state electric current as a maximum flame strength in response to a received input from a user. The control system 7100 then determines a plurality of lengths of time longer than the initial length of time corresponding to a plurality of flame strength levels less than the maximum flame strength. Subsequently, when the controller 7200 receives signals from the flame probe circuit 7302, the control system 7100 determines the strength of the flame on the main burner 730 by comparison of the determined length of time to the correspondences stored in the memory. In other embodiments, the control system 7100 may store, in the memory 7204, an initial length of time taken for a transition between a signal representative of no electric current and a signal representative of the steady state electric current as a maximum flame strength in response to a received input from a user, without calculating the plurality of lengths of time longer than the initial length of time. Rather, in such embodiments, when the controller receives subsequent signals from the flame probe circuit 7302, the controller determines the strength of the flame on the main burner 730 by comparison of the determined length of time to the initial length of time.

In the example embodiment, the control system 7100 displays on a display 7308, an indication of the strength of the flame determined by the control system 7100. The display may be displayed as a number or a word on the display 7308, when the display 7308 is capable of displaying numbers and/or text. For example, the display may be of a number on an arbitrary scale (e.g., a number between 1 and 10, with 10 being maximum flame), a percentage of the maximum flame, a word description of the flame strength (e.g., "maximum flame," "medium flame," and the like), the magnitude of the flame current determined by the control system 7100, or any other suitable text or numerical display. Alternatively, the display may be a symbolic display, such as lighting a particular number of lights (e.g., LEDs) on the display 7308, lighting a particular light that indicates a particular flame strength (e.g., a light next to a printed label that reads "maximum flame"), lighting different colored lights (or changing the color or a single light) to indicate the strength of flame (e.g., green for maximum flame strength, red for no flame, and various other colors for flame strengths between maximum flame and no flame), or any other suitable symbolic display of the flame strength level.

The control system 7100 is programmed in some embodiments to output an alert when the determined strength of the flame on the main burner 730 is less than a threshold value indicating a strong flame and greater than a threshold value indicating no flame is present. That is, an alert threshold value between no flame and maximum flame is stored in the memory 7204. When the control system 7100 determines a flame strength that is less than the alert threshold value, the control system 7100 outputs an alert to indicate that a low flame is present and/or the flame probe 729 is dirty or faulty. The alert may be a human cognizable alert, such as a visible alert (e.g., lighting an alert light, flashing on or more lights, displaying "alert" on the display 7308, or the like), or an audible alert (e.g., ringing a bell, sounding a siren, playing a melody through a speaker, or the like). Additionally, or alternatively, the alert may be an electronic alert, such as a signal output from the communication interface 7212 to a remote computing device. The remote computing device may be a monitoring computer, the user's computer, the user's mobile communication device (e.g., a cell phone, tablet, or the like), a smart home hub, or any other suitable remote computing device. In some embodiments, the control system 7100 stores, in the memory 7204, an indication that the alert was sent and data about the alert (e.g., determined length of time, determined flame strength, date of occurrence, time of day, input voltage, and/or other suitable data). This data may then be accessed by the user or a repair person either through the user interface or remotely.

In some embodiments, the control system 7100 makes at least some determinations by comparison of historical data about the flame current. In such embodiments, the control system 7100 stores the determined flame currents in the memory 7204 during operation. In some embodiments, the control system 7100 analyzes that stored data to estimate when the flame probe 729 will need to be repaired, cleaned, or replaced. As explained above, over time the flame probe 729 will accumulate an insulating coating that will gradually decrease the current that flows through the flame probe 729 (even under otherwise same conditions). By comparing previous measurements, a rate of decline in the measured flame current can be determined, and the time when the measured flame current will be too low can be estimated. This time may be stored in the memory 7204 for retrieval by a user or repair person, or may be transmitted to a remote computing device (similar to the alerts discussed above). Similarly, by storing the previous flame current determinations, the control system 7100 may compare the present flame current determination to the previous determinations to identify anomalous determinations. For example, over a long period of time, the determined flame current will gradually (and relatively smoothly) decrease at a determinable rate. If a present time determination varies significantly (i.e., much more than the determined rate of decrease), the controller may determine that there may be a problem with the water heater 720, such as a catastrophic failure of the flame probe 729, damage/contamination of the main burner 730 resulting in a significantly lower flame, or the like. In such circumstances, the control system 7100 may output an alert similar to the alerts discussed above so that the water heater 720 may be inspected, cleaned, and repaired as needed.

Figure 10:
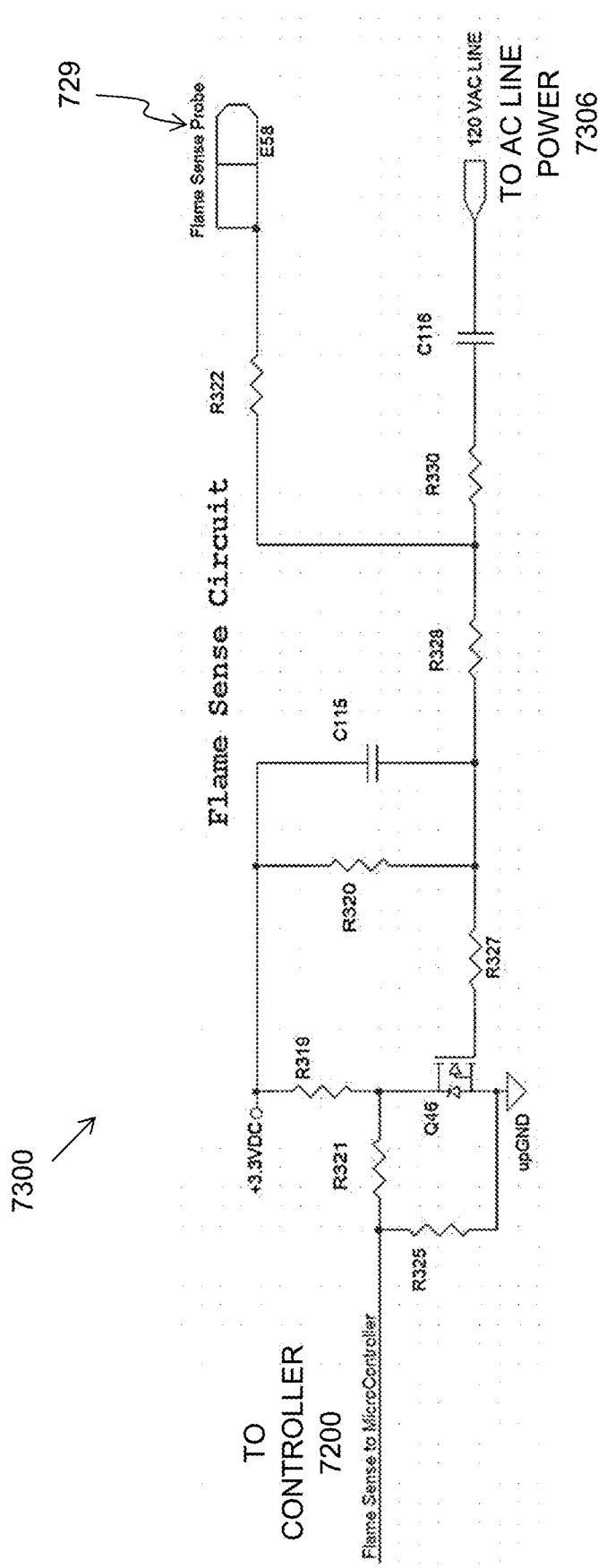
FIG. 10 is a circuit diagram of an embodiment of the flame sensor assembly shown in FIG. 9.

FIG. 10 is a circuit diagram of an example flame probe circuit 7302 for use in the flame probe assembly 7300. When no current is flowing from the flame probe 729 to the main burner 730, the gate of the MOSFET Q45 is sufficiently high voltage to turn on (i.e., make conducting) the MOSFET Q45, thus making the voltage on R321 low with respect to 3.3 VDC and thus a low DC voltage or no voltage (e.g., 0V) is output to controller 7200 as a logical low signal indicating that no flame is detected. When current begins to flow from flame probe 729 to the main burner 730 because a flame has been ignited, the voltage on the gate of the MOSFET Q45 will have a DC and AC component and will move lower with time. As this voltage crosses the turn on voltage of the gate of FET Q45, because of the AC component, Q45 will be alternately be turned ON and OFF. This will cause the voltage on R321 to alternately be Low and High respectively. In this state, the signal sent to controller 7200 will be alternating low and high. If the flame current is high enough to pull the voltage of the gate of FET Q45 to where even with the AC component the voltage is always below the FET Q45 turn on voltage, then the FET will remain OFF and the voltage on R321 will be High and the signal sent to controller 7200 will be high, or close to 3.3 VDC, indicating that a flame is present. Thus, during this length of time, the control system 7100 receives a pulsating signal that fluctuates between indicating that a flame is present and no flame is present. As the flame increases and the system reaches a steady state, the voltage on the gate of the MOSFET Q45 will reach a steady state at a low voltage keeping the MOSFET Q45 off, and providing a substantially constant logic high signal to the controller 7200, thereby indicating that the flame is detected. Here, the time to go from all low flame signal to all high flame signal is inversely proportional to the steady state flame current, i.e., stronger flame takes a shorter time to transition from all low to all high and a weaker flame takes a longer time to transition from all low to all high. A similar process happens, when the flame on the main burner 730 is extinguished. That is, the previously constant logic high signal begins to pulse between high and low until a steady state is reached, the MOSFET Q45 remains on, and a substantially constant low signal is output to the controller 7200. Here, the time to go from all high flame signal to all low no flame signal is proportional to the steady state flame current, i.e., stronger flame takes a longer time to transition from all high to all low and a weaker flame takes a shorter time to transition from all High to all low.

Figure 11:
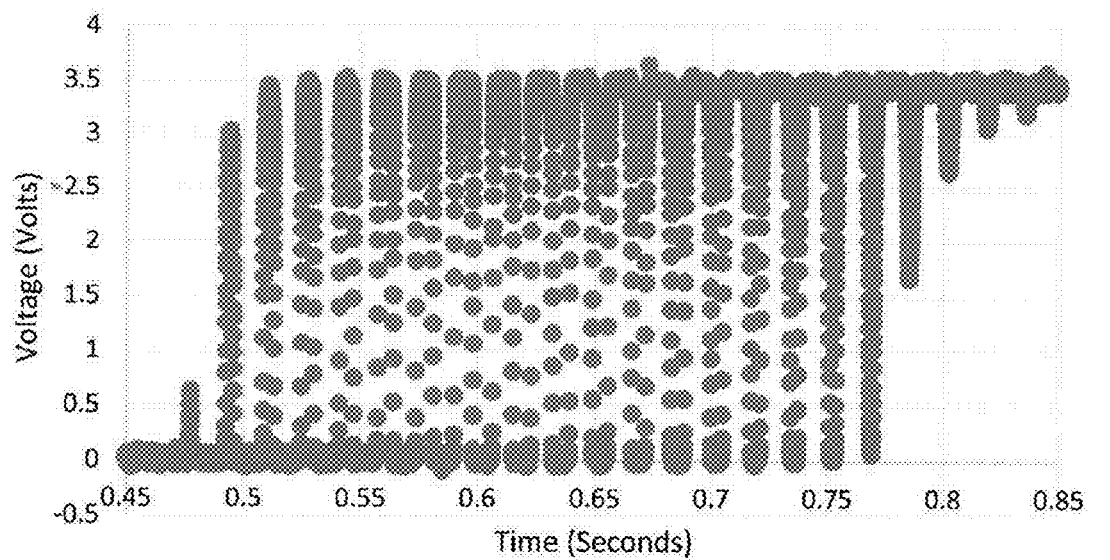
FIGS. 11 and 12 are graphs of simulated outputs of the flame probe circuit.
Figure 12:
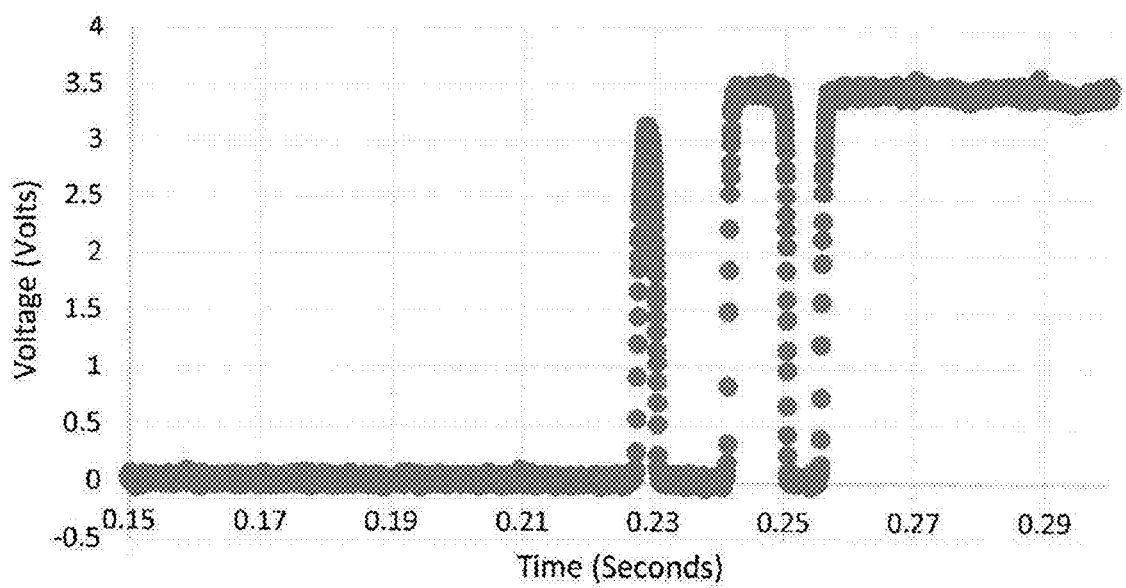

FIGS. 11 and 12 are graphs of simulated outputs of the flame probe circuit 7302 in FIG. 10 for a 0.5 microamp ($\mu$A) flame current and a 2.0 $\mu$A flame current respectively. As can be seen, for the 0.5 $\mu$A flame current in FIG. 11, the output pulses between 3.5 volts and 0 volts for approximately 0.35 seconds. In contrast, for a 2 $\mu$A flame current, the pulses last less than 0.04 seconds. It should also be noted that the number of pulses of the output (which occur approximately at the same frequency of the AC power source 7306) increase as the flame current decreases. Thus, based on either the length of time that the pulses last or the number of pulses that occur before a steady state is reached, the control system 7100 can determine the flame current that is flowing. It should also be noted that the relationship between current and length of time (and number of pulses) inverts during turn off of the flame. That is, when turning off the flame, the length of time that the signal pulses is longer for a larger flame current and there are more pulses for the larger flame current.

Figure 13:
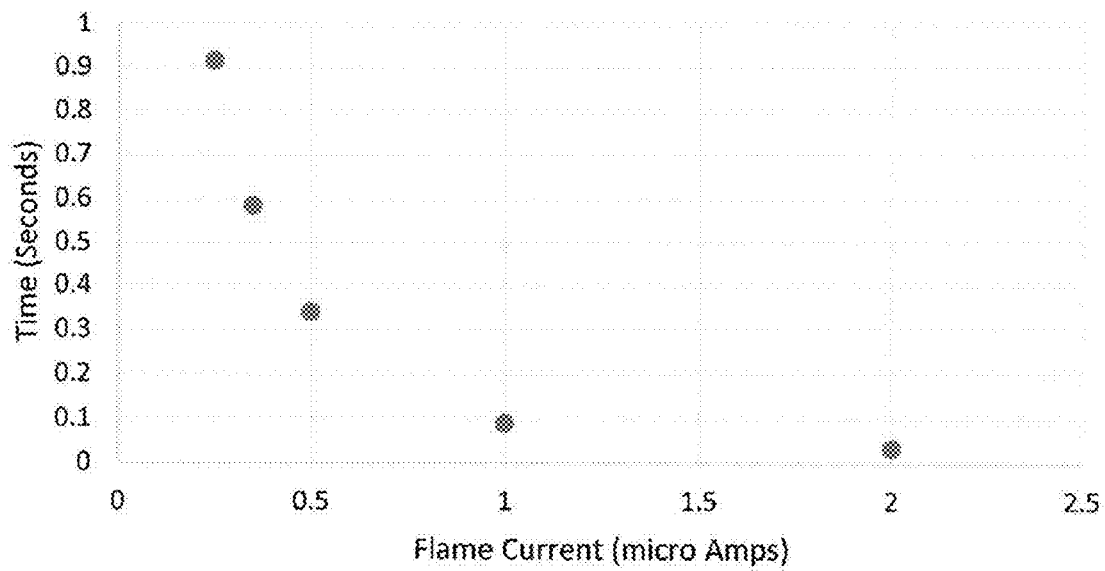
FIGS. 13 and 14 are graphs of the approximate length of time for the transition between a no flame present output and a flame present output for the flame probe circuit.
Figure 14:
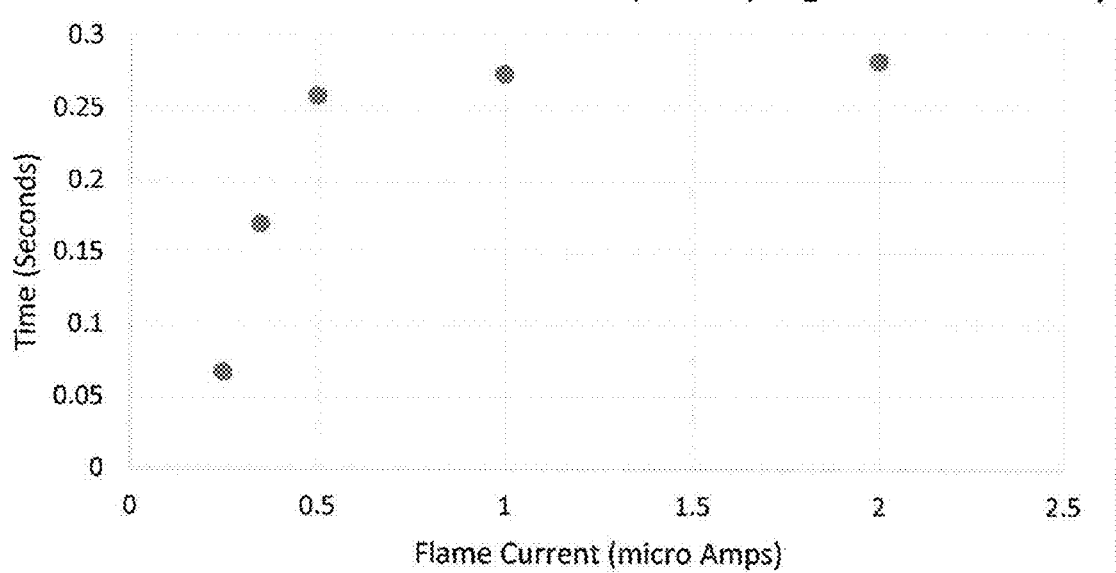

FIGS. 13 and 14 are graphs of the approximate length of time for the transition between a no flame present output and a flame present output for the flame probe circuit 7302 in FIG. 10 for various flame currents. FIG. 13 graphs the times for a transition from no flame present to flame present (i.e., when the flame is first ignited on the main burner 730), while FIG. 14 graphs the times for a transition from a signal representative of flame present to a signal representative of no flame present (i.e., when the flame on the main burner 730 is extinguished). It can be seen that the length of time that the output signal fluctuates appears to vary more when transitioning from no flame present to flame present (FIG. 13) than the transition when the flame is extinguished (FIG. 14). For example, during turn on (FIG. 13), the time difference between a 0.5 $\mu$A flame current and a 2 $\mu$A flame current is about 0.3 seconds, while during turn off (FIG. 14), the time difference for the same flame currents is less than 0.05 seconds. Thus, the use of the length of time that the output signal of the flame probe circuit 7302 pulses during the transition from no flame present to flame present may be preferred in some embodiments to allow more granularity, the use of lower sampling rates, and the like.

Embodiments of the methods and systems described herein achieve superior results compared to prior methods and systems. The systems are operable to detect multiple flame current levels to provide a more detailed view of the operation of the gas powered appliance. Moreover, the example systems and methods do so without the need for a sensitive current sensor capable of detecting differences of a few microamps of current. Further the example methods and systems may provide early warning of the need for appliance maintenance, and/or flame probe replacement or repair. On installations where the flame probe is not located correctly to give a good flame signal, the methods and systems of this disclosure allow the poor location to be detected early during installation and corrected. For appliances, such as gas furnaces, that may be inspected infrequently (e.g., once per year), the example systems and methods allows for more accurate estimation of whether or not the appliance will last until the next inspection without needing service on the flame probe by providing better/earlier warning of a failing/dirty probe.

Example embodiments of systems and methods for controlling a water heater are described above in detail. The system is not limited to the specific embodiments described herein, but rather, components of the system may be used independently and separately from other components described herein. For example, the controller and processor described herein may also be used in combination with other systems and methods, and are not limited to practice with only the system as described herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9,1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gas powered water heater comprising:
   a storage tank for holding water;
   a main burner for burning gas to heat water in the storage tank;
   a flame probe assembly including:
      a probe positioned proximate the main burner to couple an electric current including an alternating current (AC) component and a direct current (DC) component to the main burner through a flame on the main burner and not to couple an electric current to the main burner when the flame is not present on the main burner; and
      a flame probe circuit coupled to the probe to output binary signals corresponding to whether or not flame is present on the main burner, the flame probe circuit including a transistor having a control terminal to receive a control voltage having an AC component and a DC component, wherein the control voltage changes in magnitude based on a magnitude of the electric current coupled by the probe to the main burner through the flame, the control voltage causes the transistor to be in a first state when no electric current is coupled to the main burner, the control voltage causes the transistor to be in a second state when the magnitude of the electric current coupled to the main burner is high, the control voltage causes the transistor to vary between the first state and the second state when the electric current is transitioning between no current and the high magnitude, and the binary signals have a first value when the transistor is in the first state and a second value when the transistor is in the second state; and
   a controller connected to the flame probe assembly, the controller including a wireless communication interface, a processor, and a memory containing instructions that program the controller to:
      control the main burner to selectively heat water in the storage tank,
      receive the binary signals from the flame probe assembly,
      determine a length of time that the binary signals vary between the first value and the second value before settling to the second value at a steady state electric current when a flame is present on the main burner,
      determine, based at least in part on the determined length of time, the strength of the flame, and output, using the wireless communication interface, an indication of the strength of the flame to a mobile device for display on the mobile device.

2. The gas powered water heater of claim 1, wherein the indication of the strength of the flame comprises an indication of one of a plurality of predetermined strength levels, each predetermined strength level covering a range of strengths of flame, and the plurality of predetermined strength levels comprises more than three predetermined strength levels.

3. The gas powered water heater of claim 1, wherein the indication of the strength of the flame comprises a magnitude of the electric current provided through the probe.

4. The gas powered water heater of claim 1, wherein the wireless communication interface comprises a near field communication (NFC) wireless interface.

5. The gas powered water heater of claim 1, wherein the wireless communication interface comprises a Bluetooth wireless interface.

6. The gas powered water heater of claim 1, wherein the instructions further program the controller to:
periodically determine the strength of flame;
store the periodically determined strengths of flame in the memory; and
output to the mobile device a history of the strength of flame based on the periodically stored determined strengths of flame for display on the mobile device.

7. A gas powered appliance comprising:
a burner for burning gas;
a flame probe assembly including:
a probe positioned proximate the main burner to couple an electric current including an alternating current (AC) component and a direct current (DC) component to the main burner through a flame on the main burner and not to couple an electric current to the main burner when the flame is not present on the main burner; and
a flame probe circuit coupled to the probe to output binary signals corresponding to whether or not flame is present on the main burner, the flame probe circuit including a transistor having a control terminal to receive a control voltage having an AC component and a DC component, wherein the control voltage changes in magnitude based on a magnitude of the electric current coupled by the probe to the main burner through the flame, the control voltage causes the transistor to be in a first state when no electric current is coupled to the main burner, the control voltage causes the transistor to be in a second state when the magnitude of the electric current coupled to the main burner is high, the control voltage causes the transistor to vary between the first state and the second state when the electric current is transitioning between no current and the high magnitude, and the binary signals have a first value when the transistor is in the first state and a second value when the transistor is in the second state; and
a controller connected to the flame probe assembly, the controller including a wireless communication interface, a processor, and a memory containing instructions that program the controller to:
control the burner,
receive the binary signals from the flame probe assembly,
determine a length of time that the binary signals vary between the first value and the second value before settling to the second value at a steady state electric current when a flame is present on the main burner,
determine, based at least in part on the determined length of time, the strength of the flame, and
output, using the wireless communication interface, an indication of the strength of the flame to a mobile device for display on the mobile device.

8. The gas powered appliance of claim 7, wherein the indication of the strength of the flame comprises an indication of one of a plurality of predetermined strength levels, each predetermined strength level covering a range of strengths of flame, and the plurality of predetermined strength levels comprises more than three predetermined strength levels.

9. The gas powered appliance of claim 7, wherein the indication of the strength of the flame comprises a magnitude of the electric current provided through the probe.

10. The gas powered appliance of claim 7, wherein the wireless communication interface comprises a near field communication (NFC) wireless interface.

11. The gas powered appliance of claim 7, wherein the wireless communication interface comprises a Bluetooth wireless interface.

12. The gas powered appliance of claim 7, wherein the instructions further program the controller to:
periodically determine the strength of flame;
store the periodically determined strengths of flame in the memory; and
output to the mobile device a history of the strength of flame based on the periodically stored determined strengths of flame for display on the mobile device.

13. A system comprising:
a mobile device including:
a display,
a mobile device wireless communication interface,
a mobile device controller including a mobile device processor and a mobile device memory; and
a gas powered appliance including:
a burner for burning gas;
a flame probe assembly including:
a probe positioned proximate the main burner to couple an electric current including an alternating current (AC) component and a direct current (DC) component to the main burner through a flame on the main burner and not to couple an electric current to the main burner when the flame is not present on the main burner; and
a flame probe circuit coupled to the probe to output binary signals corresponding to whether or not flame is present on the main burner, the flame probe circuit including a transistor having a control terminal to receive a control voltage having an AC component and a DC component, wherein the control voltage changes in magnitude based on a magnitude of the electric current coupled by the probe to the main burner through the flame, the control voltage causes the transistor to be in a first state when no electric current is coupled to the main burner, the control voltage causes the transistor to be in a second state when the magnitude of the electric current coupled to the main burner is high, the control voltage causes the transistor to vary between the first state and the second state when the electric current is transitioning between no current and the high magnitude, and the binary signals have a first value when the transistor is in the first state and a second value when the transistor is in the second state; and a controller connected to the flame sensor, the controller including an appliance wireless communication interface, a processor, and a memory containing instructions that program the controller to:

control the burner, receive the binary signals from the flame probe assembly, determine a length of time that the binary signals vary between the first value and the second value before settling to the second value at a steady state electric current when a flame is present on the main burner, determine, based at least in part on the determined length of time, the strength of the flame, and output, using the appliance wireless communication interface, an indication of the strength of the flame to the mobile device for display on the display of the mobile device, wherein the mobile device memory contains instructions that program the mobile device controller to receive the indication of the strength of the flame using the mobile device wireless communication interface, and to display the indication of the strength of flame on the display.

14. The system of claim 13, wherein the indication of the strength of the flame comprises an indication of one of a plurality of predetermined strength levels, each predetermined strength level covering a range of strengths of flame, and the plurality of predetermined strength levels comprises more than three predetermined strength levels.

15. The system of claim 13, wherein the indication of the strength of the flame comprises a magnitude of the electric current provided through the probe.

16. The system of claim 13, wherein the mobile device wireless communication interface and the appliance wireless communication interface comprise near field communication (NFC) wireless interfaces.

17. The system of claim 13, wherein the mobile device wireless communication interface and the appliance wireless communication interface comprise Bluetooth wireless interfaces.

* * * * *